(12) United States Patent
Aubry et al.

(10) Patent No.: US 7,945,140 B2
(45) Date of Patent: May 17, 2011

(54) APPARATUS AND METHOD FOR STORING AND RETRIEVING DIGITAL REAL TIME SIGNALS IN THEIR NATIVE FORMAT

(75) Inventors: Laurent Aubry, Sunnyvale, CA (US);
Robert Caldeira, Santa Cruz, CA (US);
Tain-Shain Lee, San Jose, CA (US)

(73) Assignee: nNovia, Inc., San Jose, CA (US)

( * ) Notice: Subject to any disclaimer, the term of this patent is extended or adjusted under 35 U.S.C. 154(b) by 1286 days.

(21) Appl. No.: 10/309,662

(22) Filed: Dec. 3, 2002

(65) Prior Publication Data
US 2003/0190157 A1  Oct. 9, 2003

Related U.S. Application Data

(60) Provisional application No. 60/338,520, filed on Dec. 3, 2001.

(51) Int. Cl.
H04N 5/04 (2006.01)
H04N 7/52 (2006.01)
(52) U.S. Cl. ............................................. 386/66; 386/71
(58) Field of Classification Search .................... 360/32; 386/66, 125; 718/107; 375/240, 240.01
See application file for complete search history.

(56) References Cited

U.S. PATENT DOCUMENTS

| | | | | |
|---|---|---|---|---|
| 3,539,716 A | * | 11/1970 | Poulett et al. | ..................... 386/66 |
| 4,694,357 A | * | 9/1987 | Rahman et al. | ................ 386/124 |
| 5,438,423 A | | 8/1995 | Lynch et al. | |
| 5,563,714 A | * | 10/1996 | Inoue et al. | ...................... 386/66 |
| 5,568,274 A | * | 10/1996 | Fujinami et al. | .............. 386/107 |
| 6,233,389 B1 | | 5/2001 | Barton et al. | |
| 6,233,390 B1 | | 5/2001 | Yoneda | |
| 6,304,714 B1 | | 10/2001 | Krause et al. | |
| 6,833,865 B1 | * | 12/2004 | Fuller et al. | ................ 348/231.2 |
| 7,035,468 B2 | * | 4/2006 | Yogeshwar et al. | .......... 382/232 |
| 2002/0085835 A1 | * | 7/2002 | Zhang et al. | ................... 386/124 |
| 2002/0157103 A1 | * | 10/2002 | Song et al. | ....................... 725/97 |

FOREIGN PATENT DOCUMENTS
WO  WO03048904 A3 * 6/2003

OTHER PUBLICATIONS

Ke Shen, Lawrence A. Rowe, and Edward J. Delp, _A Parallel Implementation of an MPEG-1 Encoder: Faster Than Real Time, 2419 Proc. of SPIE 407 (Feb. 1995).*
D. Kim, J. Young, S. Milton, H.J. Kim, and Y. Kim, _A Real-Time MPEG Encoder Using a Programmable Processor_, 40 IEEE Transactions on Consumer Electronics 161 (Apr. 1994).*

* cited by examiner

*Primary Examiner* — David Czeka
*Assistant Examiner* — David N Werner
(74) *Attorney, Agent, or Firm* — Haynes and Boone, LLP

(57) ABSTRACT

An embedded system which stores, controls and retrieves real-time digital signals is configured as a programmable and reconfigurable embedded system. The embedded system interface is capable of handling in real time both continuous and irregular signal formats, such as Digital Video (DV) and MPEG, and stores the received signal in a format optimized for its storage medium. Upon retrieval, the signal is reconstituted back to its original format. In one example, the embedded system can receives and retrieve multiple, simultaneous digital signal data streams for a variety of digital equipment, such as digital video recorders.

7 Claims, 11 Drawing Sheets

Description of Apparatus of Present Invention

Description of Method of the Present Invention
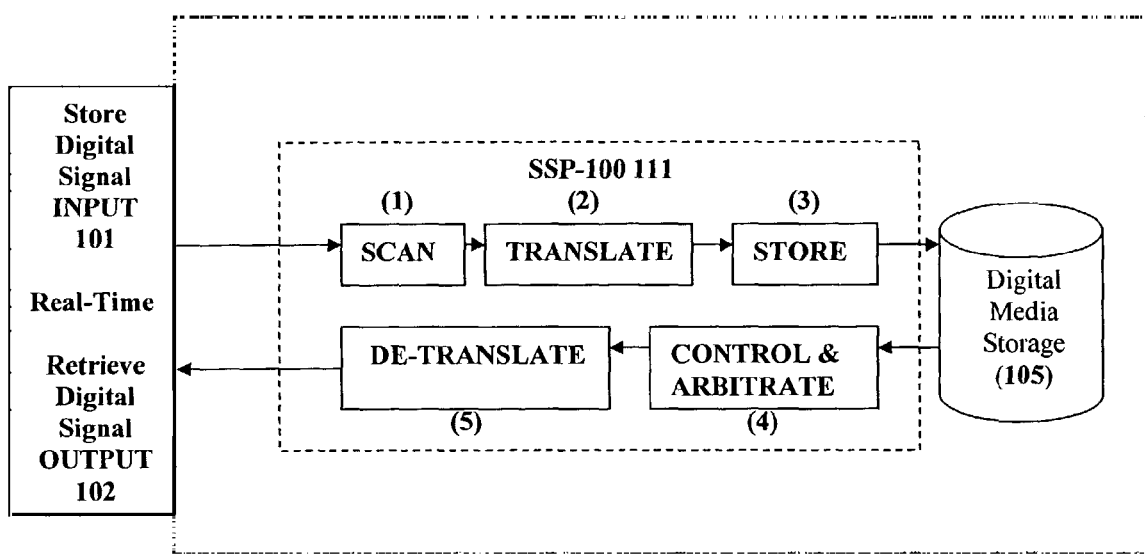
Figure 1.0

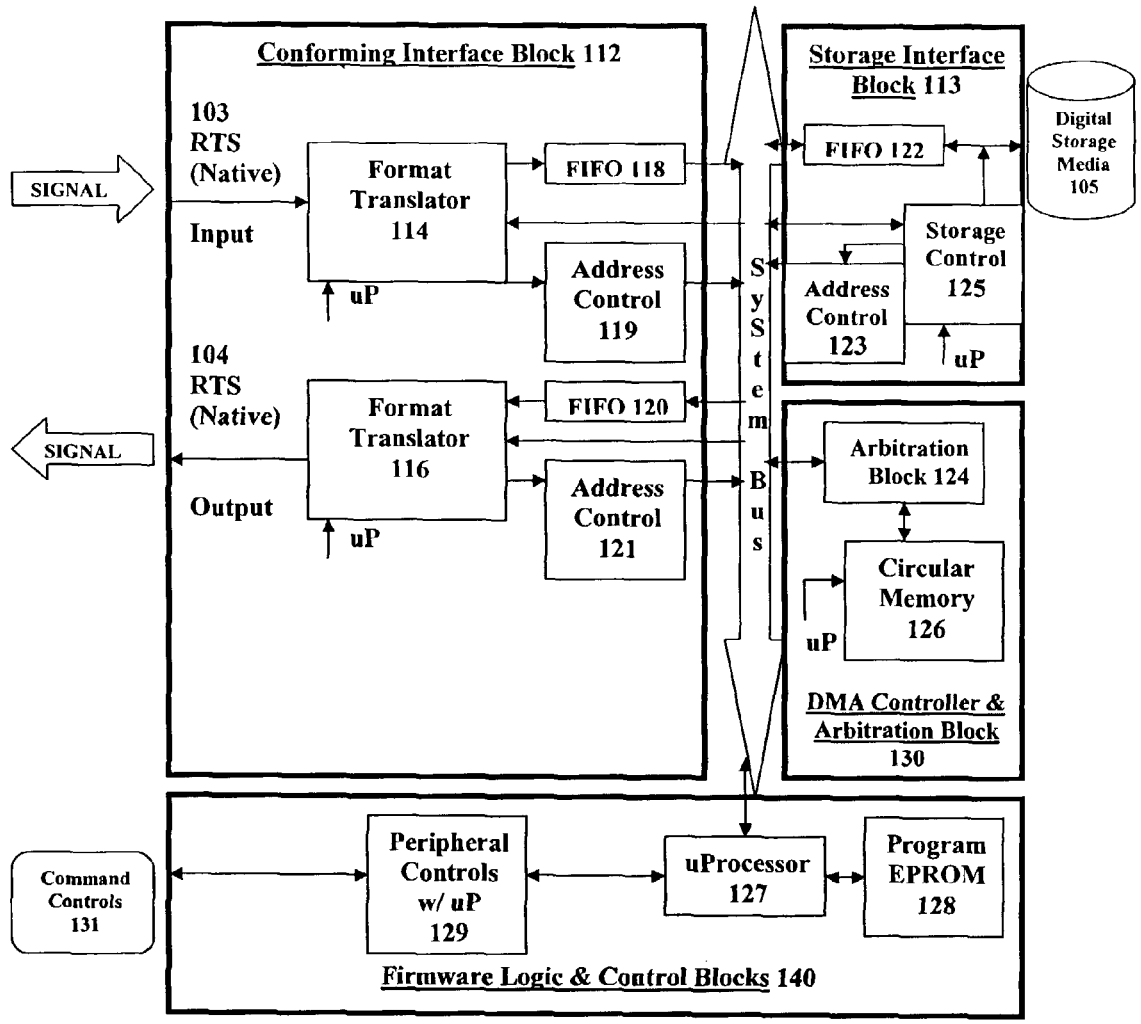
Figure 2.0

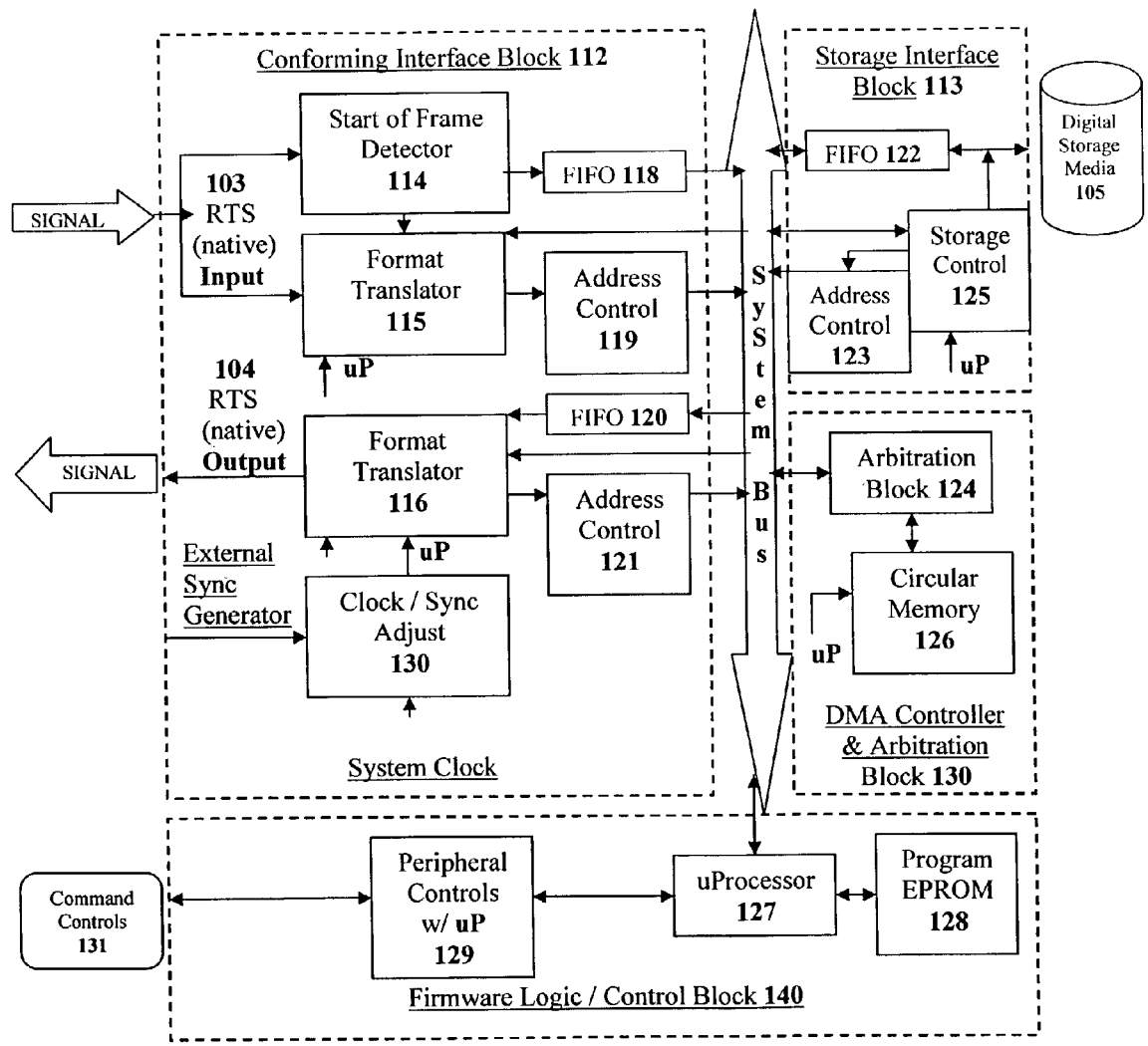
Figure 3.0

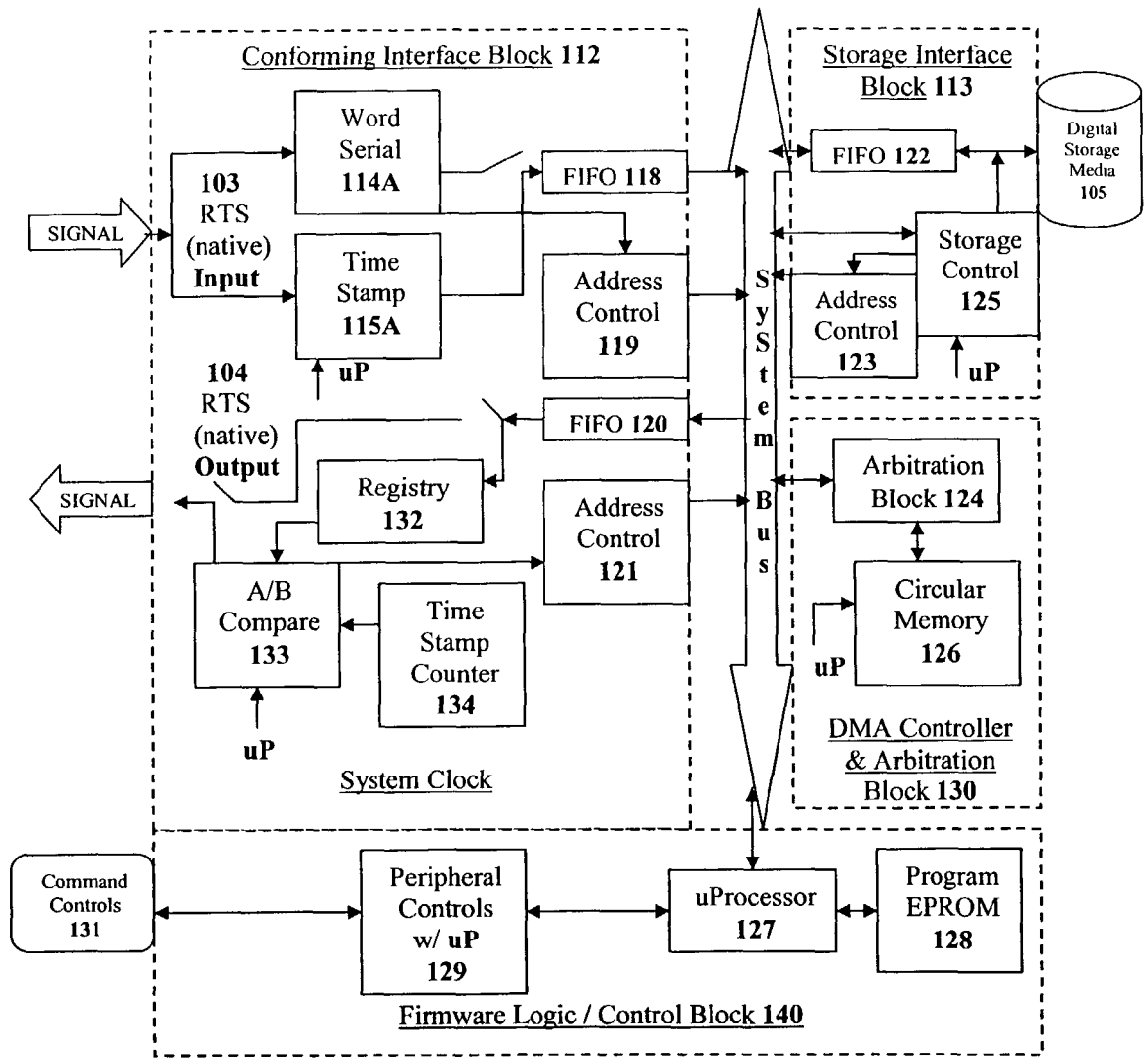
Figure 4.0

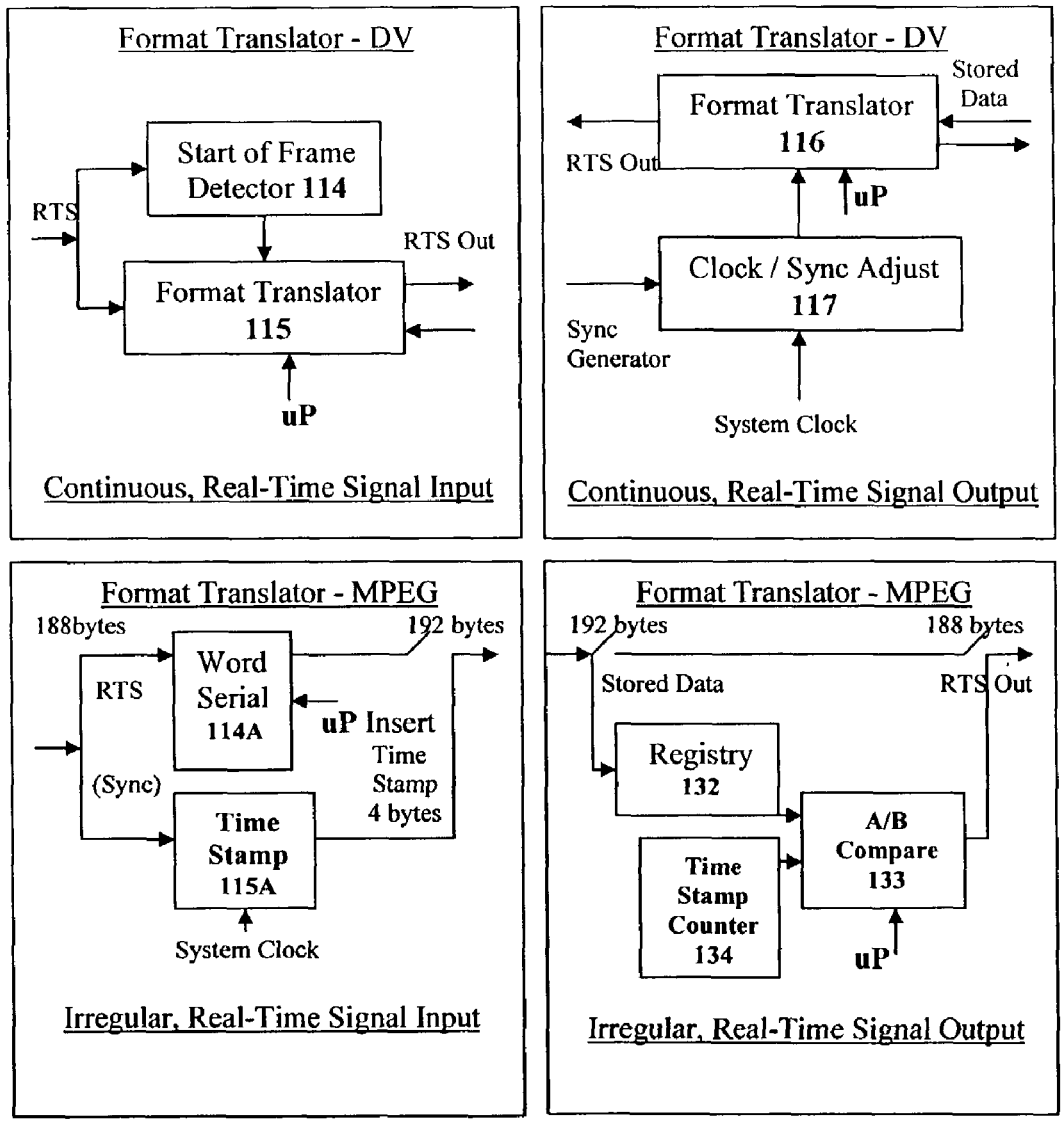
Figure 5.0

Firmware Logic and Control Blocks - Figure 6.0
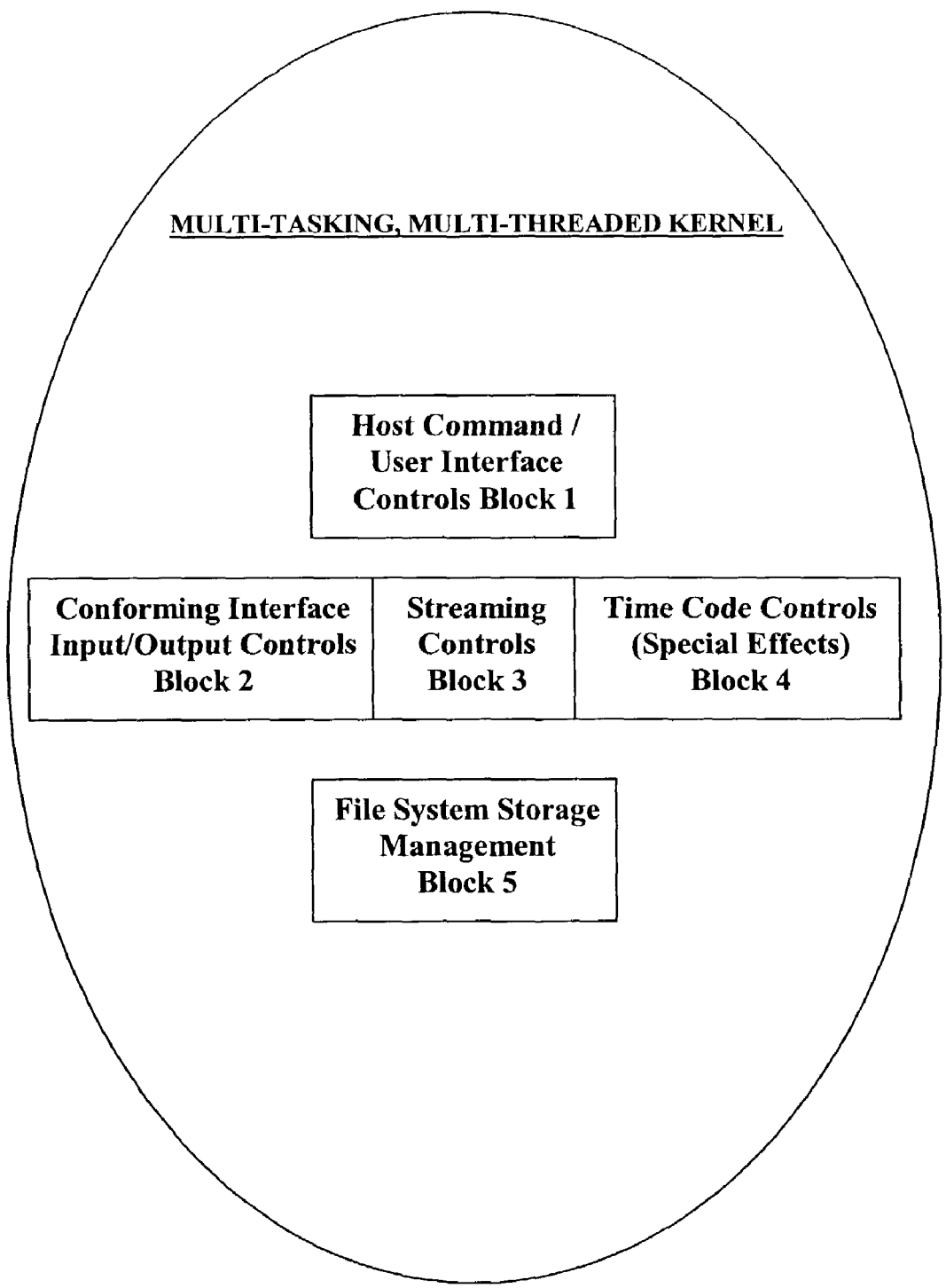

Firmware Initialization – Figure 7.0
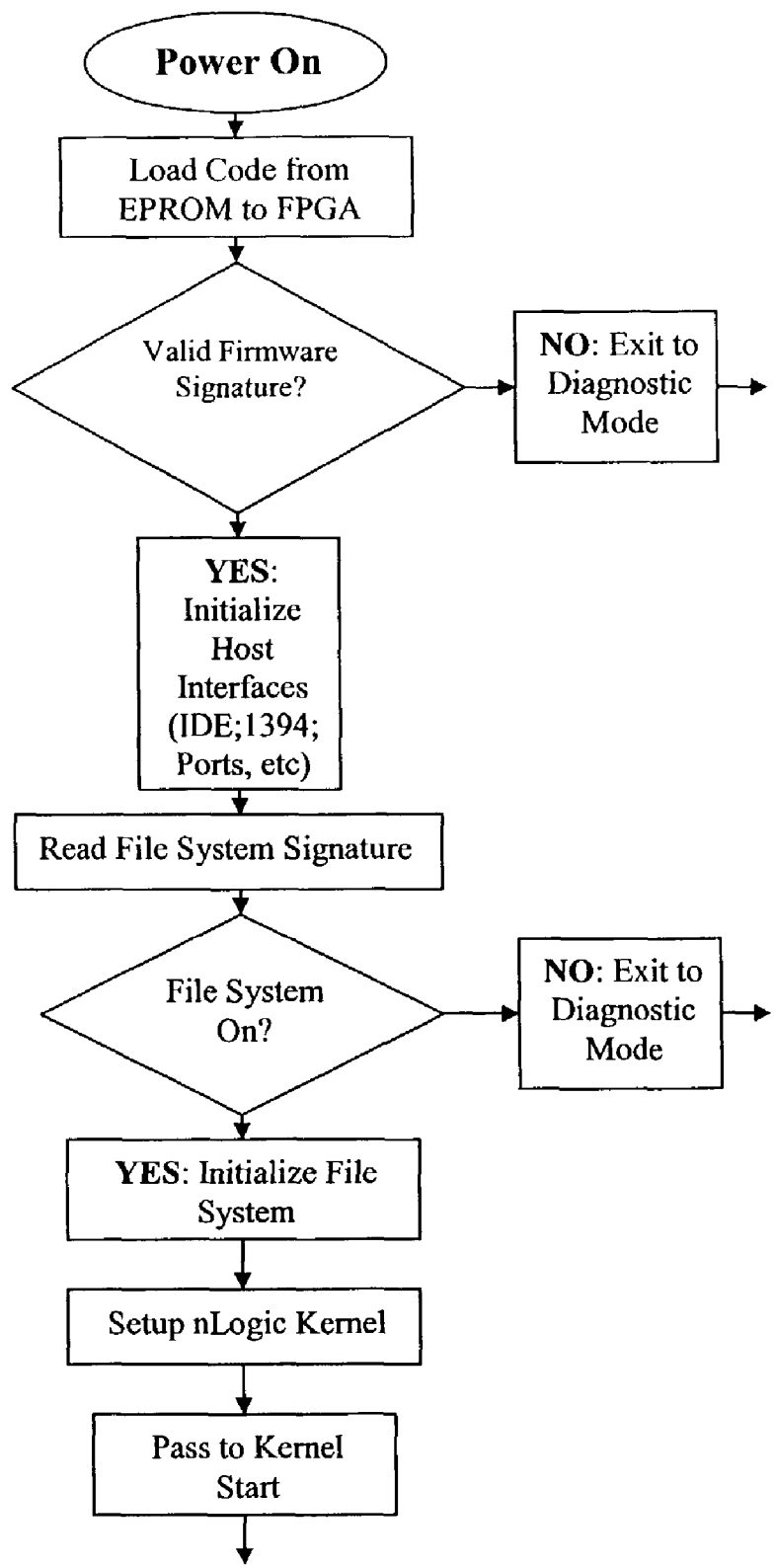

Kernel Start– Figure 8.0
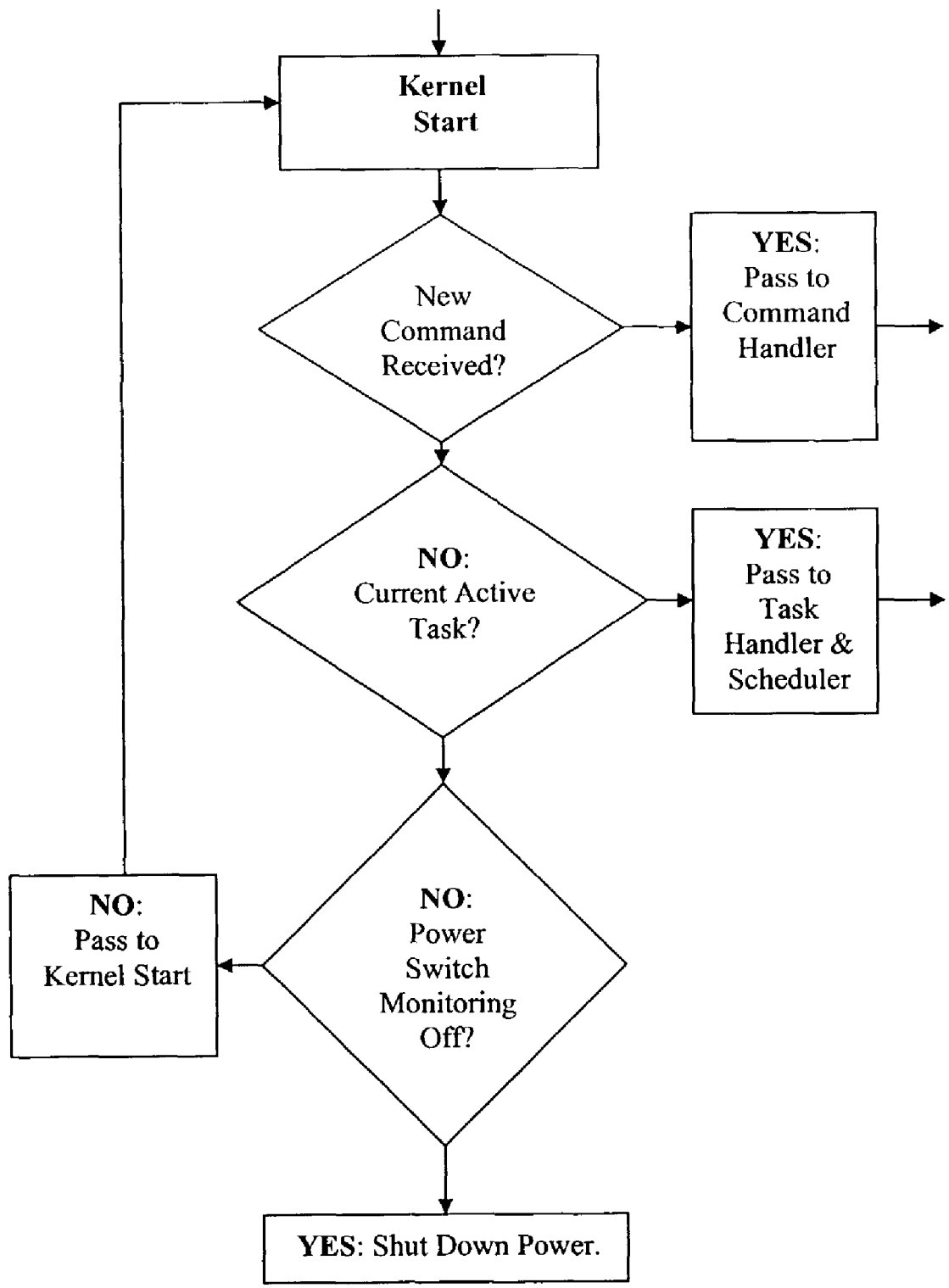

Command Handler – Figure 9.0
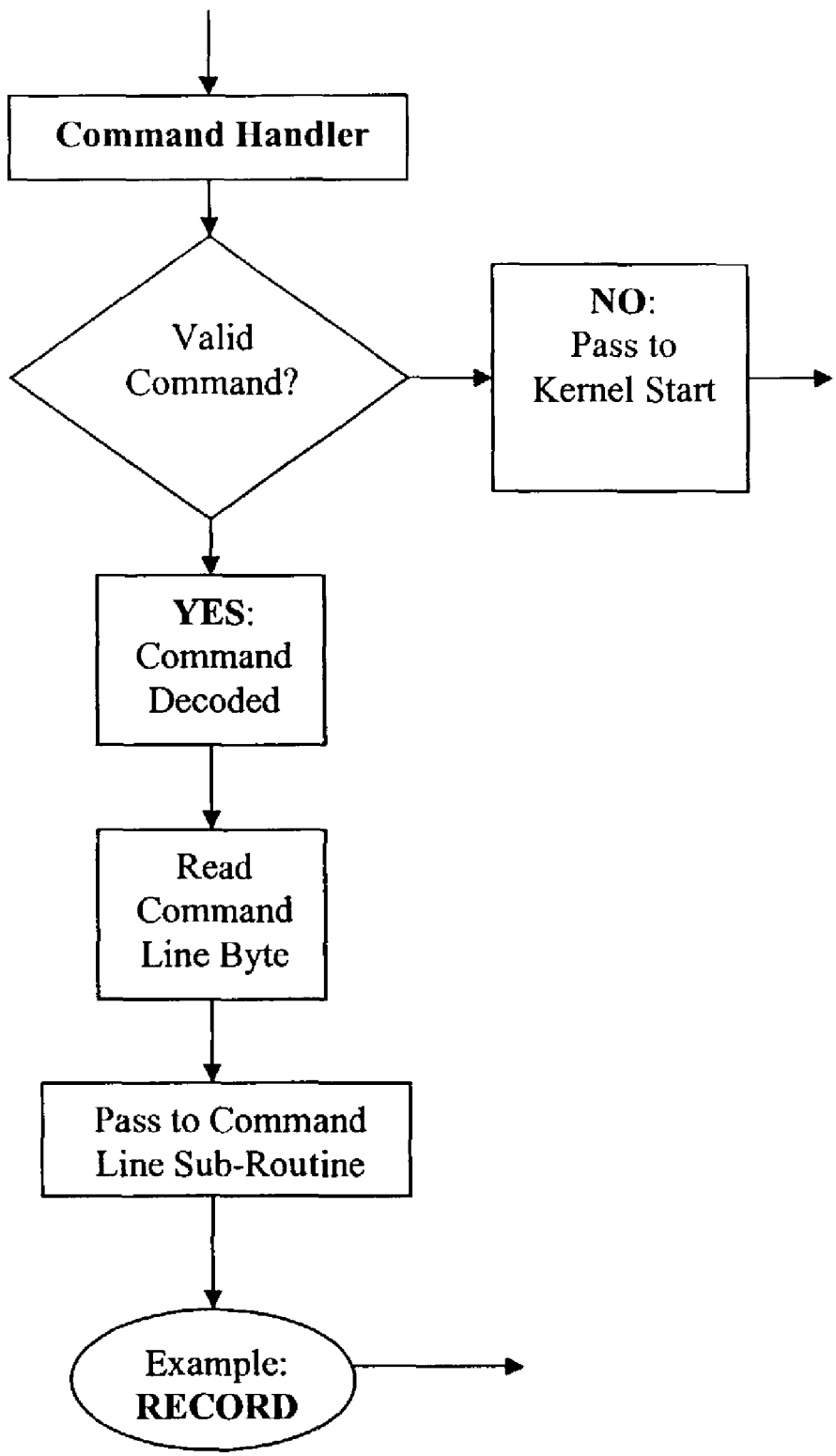

Command Line Sub-Routine: RECORD – Figure 10.0
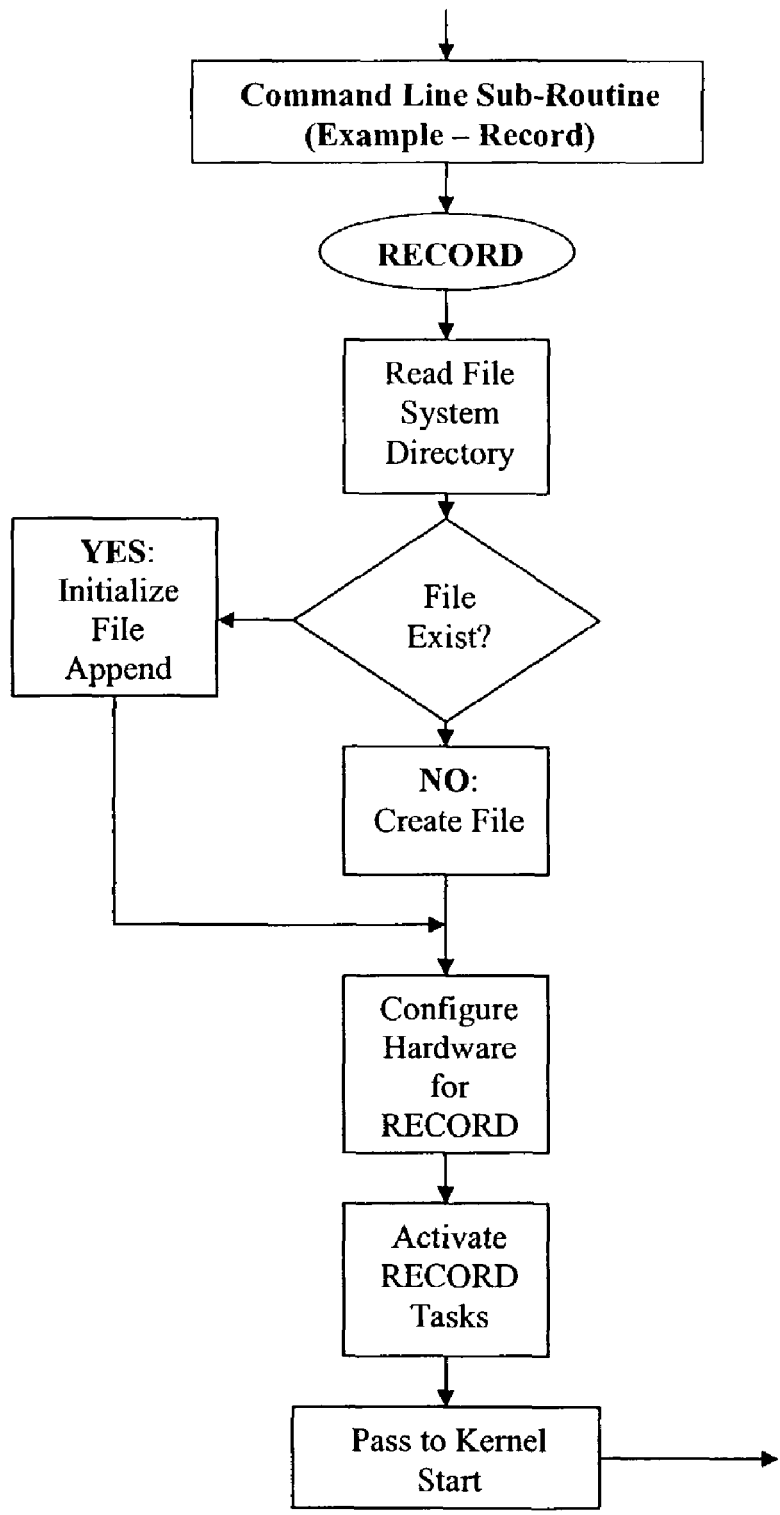

Task Handler & Scheduler: RECORD – Figure 11.0
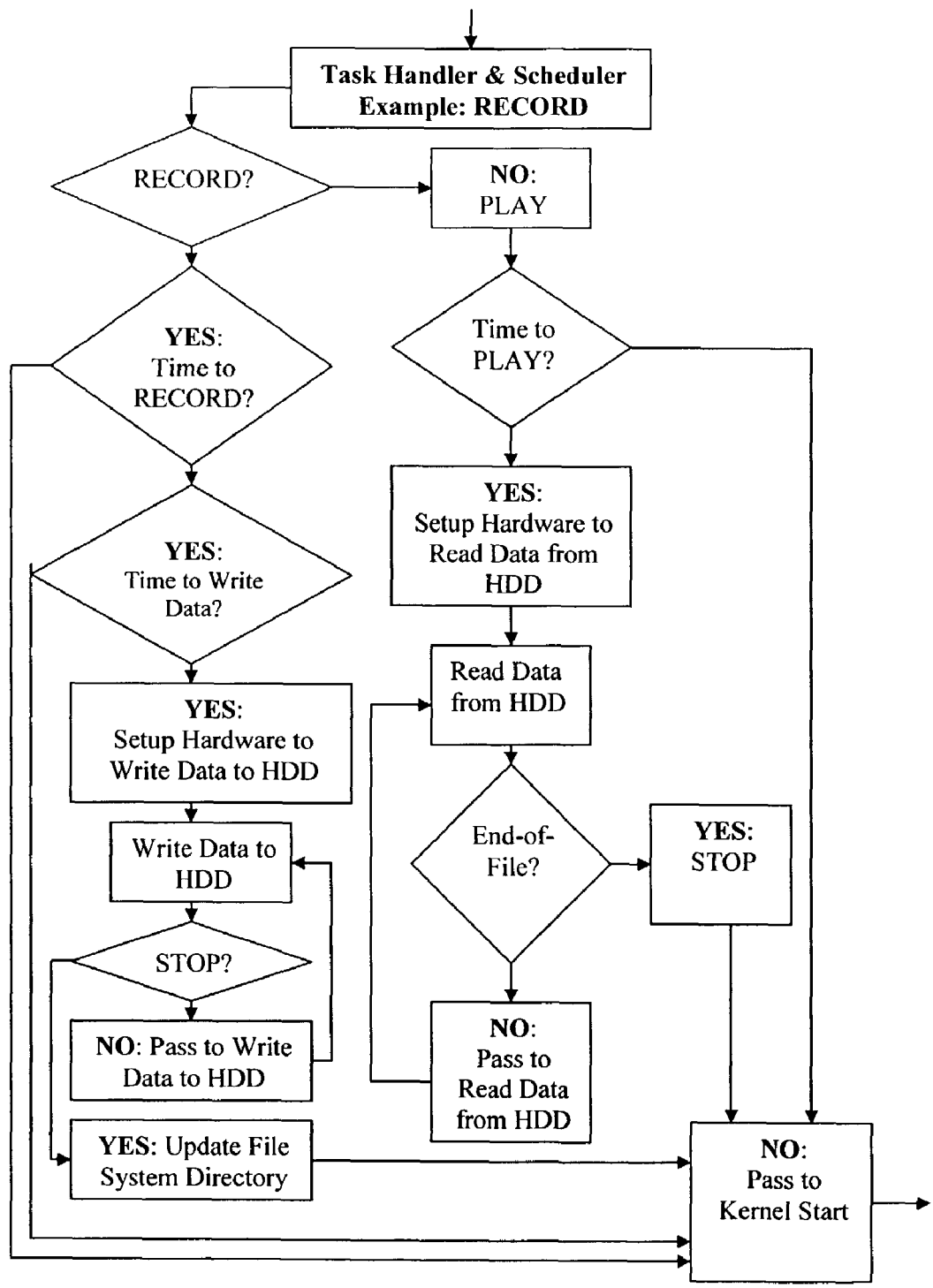

APPARATUS AND METHOD FOR STORING AND RETRIEVING DIGITAL REAL TIME SIGNALS IN THEIR NATIVE FORMAT

RELATED APPLICATIONS

This application claims priority from U.S. Provisional Application Ser. No. 60/338,520 filed on Dec. 3, 2001, incorporated herein by reference.

TECHNICAL FIELD

This invention relates to apparatus and method for storing and retrieving real time digital signals onto digital storage devices. More particularly, the present invention relates to apparatus and method for storing and retrieving real time digital signals in the original format of the digital signal, herein referred to as the digital signal's native format. Even more particularly, the present invention relates to apparatus and method for translating, controlling and managing digital signals using a programmable and reconfigurable embedded system.

BACKGROUND ART

There are complex emerging digital products that require the storage and retrieval of digital audio and video content. The key technology driving the emergence of such new digital products is the use of local digital storage and retrieval devices, particularly the low-cost hard disk drive (HDD). The HDD allows robust, cost-effective and reliable storage of digital content with the major benefit of providing "non-linear" random access to digital content. This allows users to randomly select digital content, such as video, for playback without the burden of linear searching, such as in the case of a Video Cassette Recorder (VCR).

Current digital products largely utilize Digital Computer architectures, typically referred to as Personal Computer (PC) architectures, employing HDD's to varying degrees for designing complex digital products, such as the Personal Video Recorder (PVR). PC architectures were originally designed as general purpose tools with rigid hardware requirements, but flexible software environments, that can accommodate sometimes very complex, demanding applications. The HDD was originally developed to support PC architectural requirements, so it is no surprise that PC architectures are usually used in digital product designs incorporating HDD's. Today, there are very few architectural design alternatives to PC architectures that can accommodate the incorporation of HDD's into digital devices for inherently complex applications, such as in the case of the PVR, without necessarily including the architectural specifications of the PC.

Typically, digital signal data is uniformly subjected to a generic signal translation process to provide interoperability with the multiple layers of processing that are inherent to the design architecture of the present technology, such as the PCI Bus protocol layer; the hardware layer; Operating System layer; BIOS layer; and the Application layer. This requisite translation process of the present technology is computation intensive and unnecessarily complex for creating digital appliances, which typically embody narrowly defined operational parameters that do not require interoperability with a vast majority of the layers of processing embodied by the present technology. Generic digital signal translation processing conducted by the present technology cannot restrict or vet out superfluous or unnecessary digital signal translation processing for the purposes of simple storage and retrieval of digital signal data. Such generic digital signal processing is never optimized to the specific requirements of the application or the digital storage medium utilized without additional application layers to facilitate such supplemental digital signal processing.

Today's digital product designs based on PC architectures are overly complex. This design approach is complex because the digital signal data format that is to be stored and retrieved must comply with rigid PC architectural hardware and software requirements regardless of application requirements. For example, in a video streaming application that does no supplemental processing of the digital signal other than to stream the signal from one digital device to another, a PC architectural design would necessarily involve that digital signal to be translated to support operating system (OS) compliance; PCI Bus/Hardware compliance; BIOS compliance and compliance with any application. This inherent architectural complexity illustrates the limited utility of general purpose PC architectures in applications requiring specialized data handling.

Additionally, today's digital product designs based on PC architectures are inefficient and processor intensive. For example, a HDD utilizing an industry standard file system (typically FAT32) would be required to simply store and retrieve digital signal video data. This is a processor intensive design approach due to the fact that such PC architectures must analyze the digital signal data as it searches its File Allocation Tables (FAT) for available storage—and more importantly because it is processed unidirectionally (from the top down). This leads to extremely large processing tasks involving a very large number of data entries in the FAT due to the traditionally small size (typically 32 KB) of the digital storage units (sectors) utilized by the FAT32 file system. Such small sector sizes are inefficient for video applications which are very large files, typically well in excess of 1 MB. This inefficient correlation between the unique characteristics of digital signal data and the rigidity of traditional PC file systems is symptomatic of the limitations of PC architectures and a significant contributor to the proliferation of data errors.

Further still, today's digital products utilizing PC architectures are inherently unreliable. For example in the case of PVR applications, all digital signal data must be analyzed and arbitrated. Consequently, as the processing demands placed upon typical PC architectures rapidly increase, the level of relative instability would increase proportionally. This is due to the increased processing requirements to track data errors. Design solutions for this phenomenon are usually addressed with yet more PC circuitry, more powerful microprocessors and additional specialized application layers. System costs escalate as a result and system reliability decreases in direct proportion, solely because of utilizing an inefficient design architecture that is not suited for the specific application.

Compounding the complexity, inefficiency and unreliability of PC architectures is the sometimes irregular nature of digital signal data during real-time transmissions. An example of such irregular digital signal data is MPEG digital video "packet" data where the 'valid data or content' in each packet is of varying length and consequently must be compensated with 'null data packets' to achieve uniform digital signal timing for transmission. Since generic PC architectures must transform any and all input digital signal data into a common format compatible to its inherent architecture, both invalid data and null data are committed to digital storage media without differentiation and digital signal timing must be appended through the use of supplemental specialized application layers. PC architectures can not be easily optimized for analyzing the unique real-time digital signal data "timing signatures" or timing/data artifacts without adding additional specialized application layers to the signal processing task.

Today's digital products, based upon PC architectures, must conform to the constraints edicted by the PC architectures. Taking any alternative design approach today to that of common PC architectural designs involves significant complexity since the PC architecture must provide common support to a great many applications that can be tremendously disparate in form and function. Consequently, PC architectures when applied to specific design applications for today's emerging digital products are complex, expensive and most importantly unreliable for many applications with narrow, well-defined operational requirements such as in the case with the PVR.

The few architectural design alternatives that attempt to address the aforementioned issues are "trimmed-down" variations of PC architectures, such as the Real-time Operating System (RTOS) and other similar embedded systems. These architectures do not provide a viable design solution for demanding digital products due to limited software operation and support. RTOS has a very narrow hardware focus, possess limited functionality, and is difficult to modify for specific applications—the antithesis of the PC architecture. Architectural designs of today's digital products utilizing RTOS or embedded systems are generally focused upon basic hardware applications requiring limited software support. Complex digital applications like the PVR are much too demanding upon the applications software requirements for the limited software functionality provided by RTOS to be a viable alternative. Most embedded architectures experience a similar dilemma.

Commercially available under such trade names as "TiVo" and "Replay", PVR's are becoming well known in the consumer marketplace for providing exciting feature sets not found in analog, tape-based products like the VCR. The PVR's ability to leverage the capabilities of hard disk drives enhances consumer viewing experience by providing "time-shift" features to replay or record their favorite television programs while simultaneously viewing the programs live. This feature cannot be achieved using non-linear, analog, tape-based technologies.

Examples of PVR systems employing conventional PC architectures and similar modified techniques to different degrees may be seen in U.S. Pat. No. 6,233,889 and U.S. Pat. No. 5,371,551 and its Reissue No. Re36, 801. The '889 patent teaches a TV/MPEG time-warping system that is implemented with a PC architecture. Similarly, the '551 patent and Re36, 801 also employ PC architectures.

Today there is a steadily growing need to store and retrieve digital information in digital products for a variety of applications, but such digital products must be cost effective, efficient, reliable, and have a minimalist architectural design to be successfully adopted by the marketplace. Viable alternative architectures for these digital products must provide the benefits without the liabilities of both PC and embedded architectures.

Thus, a hitherto unsolved need exists for an apparatus and method that can translate native digital signal data in real-time into an optimized data storage format; utilize digital storage media without subscribing to PC architectural requirements; preserve the unique characteristics of the original format of any type of digital signal data; and restore the translated digital signal data back to it's native format upon retrieval with minimal architectural complexity.

DISCLOSURE OF INVENTION

The present invention provides a method and apparatus for managing the storage and retrieval of both continuous and irregular real-time digital signals in a manner overcoming the limitations and deficiencies of present technologies.

The present invention further provides an apparatus and method for a highly flexible, modular, programmable and reconfigurable "conforming interface", which can accommodate different native digital signal formats. The conforming interface provides a technology that can scan, translate; and de-translate specific 'native' digital signal data to a common data storage format inherent within the present invention that is optimized for both specific data types and digital storage medium, (i.e. hard disk drive storage, solid-state storage, optical storage, etc.).

A preferred embodiment of the present invention provides a distributive architecture that is represented by its embedded components: fixed hardware logic blocks, programmable hardware logic blocks, and an embedded file system with format specific software. "Embedded" for the purposes of the present invention is defined as "local hardware and software components postured in either programmable integrated circuits (IC), such as Field Programmable Gate Arrays (FPGA) or fixed IC's, such as Application Specific Integrated Circuits (ASIC)". These 'stand-alone' embedded components scan, translate, store, arbitrate, retrieve and de-translate native digital signal data to and from digital media storage in real-time. These components do not share common device computational resources; can have their own local memory and microprocessors; and can be programmed autonomously by common methodology.

Additionally, the preferred embodiment of the present invention provides for a highly optimized embedded file system. The embedded file system is programmable and can be configured for both the type of digital signal data format and digital media utilized, as well as its capacity, within the present invention. Further, the embedded file system has a number of features endemic to the present invention such as the use of double linklets, a dynamic file allocation table, and comprehensive file management that is endemic within the present invention and provides robust and reliable operation with any digital media. These operations when coupled with the customizable command controls of the present invention provide the User with a comprehensive feature set. Typical operations or functions of the command set include, but are not limited to: play; record, fast forward, fast reverse, pause, single frame advance or reverse, slow forward, slow reverse, book marking and random access searches.

By monitoring and controlling the accumulation of digital signal data, the present invention is able to preserve the original bit rate of the transmission and store and retrieve the digital signal data in real-time. The configurability of the conforming interface and the programmable file system provide for unprecedented flexibility in optimizing the storage and retrieval functionality of the present invention. This is accomplished in the present invention by striking an optimal balance between the type of digital storage medium and its inherent operational characteristics; the volume of the digital storage medium used; and the ideal size of its storage units. This ensures that the present invention can be configured and optimized for each application where the architectural design emphasis is centered upon performance, data security and operational reliability.

These aspects, advantages and features of the present invention will be more fully understood and appreciated by those skilled in the art upon consideration of the following detailed description of a preferred embodiment, presented in conjunction with the accompanying drawings. Examples of the translation of digital signal data from its native format to one that "conforms" to the functional requirements within the present invention, would be the translating and storing of "continuous" Digital Video 25 (DV) signal data, which has native timing information embedded in its digital data stream, and the supplemental insertion of timing information, or "time-stamp", into a MPEG digital data stream in order to preserve the native timing of an otherwise "irregular" native digital signal data format. In this manner, the valid digital signal data is kept compliant to the real-time nature of the present invention with valid timing parameters. Examples of other native formats include, but are not limited to: serial signals, parallel signals, such as IEC-13818 (MPEG), radar signals, SPORT (Serial PORT) by Analog Devices, and TV broad cast signals.

BRIEF DESCRIPTION OF THE DRAWINGS

For a better understanding of the present invention, reference is made to the below-referenced accompanying drawings.

FIG. 1 is a block schematic diagram of a high level view of the method of the present invention.

FIG. 2 is a block schematic diagram of a preferred embodiment of the invention including a detailed view of the apparatus of the present invention.

FIG. 3 is a block schematic diagram of a preferred embodiment of the invention including a detailed view of the stream storage processor of the preferred embodiment of the present invention in the DV signal format.

FIG. 4 is a block schematic diagram of a preferred embodiment of the invention including a detailed view of the stream storage processor of the preferred embodiment of the present invention in the MPEG signal format.

FIG. 5 is a block schematic diagram of a preferred embodiment of the invention including a detailed view of different application specific format translator configurations.

FIG. 6 is a block schematic diagram of a preferred embodiment of the invention including a detailed view of the task modules comprising the firmware logic and control blocks comprising the file system and the multi-tasking kernel.

FIG. 7 is a block schematic diagram of a preferred embodiment of the invention including a detailed view of the task modules comprising the firmware logic initialization.

FIG. 8 is a block schematic diagram of a preferred embodiment of the invention including a detailed view of the task modules comprising the firmware logic kernel start.

FIG. 9 is a block schematic diagram of a preferred embodiment of the invention including a detailed view of the task modules comprising the firmware logic command handler.

FIG. 10 is a block schematic diagram of a preferred embodiment of the invention including a detailed view of the task modules comprising the firmware logic command line subroutine record.

FIG. 11 is a block schematic diagram of a preferred embodiment of the invention including a detailed view of the task modules comprising the firmware logic task handler and scheduler record.

BEST MODE FOR CARRYING OUT THE INVENTION

FIG. 1 illustrates a high-level overview of the method of the present invention. An input native real-time digital signal 101 is initiated. The SSP-100 111 receives the digital signal on input and scans 1 the signal in real-time to identify its unique "signal signature" and determine the beginning of the transmitted data. The signal is then translated 2 into a format common within the present invention. The data is then forwarded to temporary memory buffers until a specific amount of data is accrued to comprise an optimal storage unit for the digital storage media 105 utilized. This storage unit is then forwarded to the digital storage media 105 and stored 3.

On retrieval from the digital storage media 105 the digital signal data is first requested by the arbitrator 4; located on the digital media storage 105; and then forwarded to temporary memory buffers to be further manipulated by arbitration 4. Arbitration 4 can either produce specialized data handling routines such as multiple, independent digital data streams, or simply forward the requested digital signal data directly to de-translation 5. The digital signal is then de-translated 5 back to its original native format, inclusive of original timing information, for output 102.

FIG. 2 illustrates the detailed embodiment of the present invention describing the four primary hardware subcomponents of the apparatus of the present invention: Conforming Interface 112, DMA Controller & Arbitration Block 130, Storage Interface Block 113, and Firmware Logic/Control Block 140.

Within the Conforming Interface 112, the Format Translator 114 is used to determine the exact timing of the native digital signal and the beginning of valid digital data within that digital signal. There are two types of digital signals that are delineated by the nature of the native timing of each digital signal: "continuous" and "irregular" digital signals. Continuous digital signal data is defined for the purposes of the present invention as having native timing information endemic to the digital signal data stream at "continuous" or regular intervals. Irregular digital signal data is defined for the purposes of the present invention as lacking native timing information endemic to the digital signal data stream. Irregular digital signals must therefore have timing information inserted into the digital data stream in real-time so that it may be stored, indexed, controlled, retrieved and restored back to its original native format. The digital signal translation process of the present invention is minimalistic, highly efficient, and is highly reliable due to its optimized embedded distributive architecture.

In FIG. 2, a native real-time digital signal 103 is input to the Conforming Interface Block 112 to the Format Translator 114. The digital signal is first scanned to determine its digital signature and the beginning of valid data. The digital signal is then translated into a format common within the present invention and placed into temporary memory buffer FIFO 118 (FIFO is an acronym for "first in first out") and monitored by the Address Control 119. [Note: The Format Translator is used in generic terms in this example since this component is programmable and its configuration is application specific and dependent upon the digital signal type, continuous or irregular, as well as its format. (See FIG. 5)] The reformatted digital signal is then forwarded along the system bus to the Circular Memory 126 via the Arbitration Block 124 in the DMA Controller & Arbitration Block 130 for further processing and storage.

On output, a native real-time digital signal 104 is retrieved as stored digital signal data in a format common within the present invention from the digital storage media 105. The stored digital signal data is retrieved and forwarded by the Storage Interface Block 113 to the DMA Controller & Arbitration Block 130 where it is controlled. The stored digital signal data is received by FIFO 120 from Arbitration Block 124 and monitored by the Address Control 121 in real-time. It is then passed to the Format Translator 116 where it is de-translated back to its original, native format and passed directly to output as native real-time digital signal 104.

Format Translators 114 and 116 are programmable hardware components of the Conforming Interface Block 112 that can be configured for any type and format of digital signal data. These programmable hardware components are optimally configured by the microprocessor 127 and the Program EPROM 128 (Erasable Programmable Read Only Memory) upon the powering up of the present invention. [Note: this programming process involving the microprocessor 127 and the Program EPROM 128 is common to all programmable sub-components of the present invention.] In this instance, the Program EPROM 128 is pre-programmed to provide the requisite instructions to the microprocessor 127 to configure the Format Translators 114 and 116 for a particular digital signal type and data format; the capacity of the digital storage media utilized; and the type of digital media used with the present invention.

The FIFO 118,120 and the Address Control 119,120 are fixed hardware components of the Conforming Interface Block 112 common to all configurations of the Conforming Interface Block 112.

The DMA Controller & Arbitration Block 130 receives input digital signal data in a format common within the present invention from FIFO 118 for arbitration and further processing via the Arbitration Block 124. This formatted information is accrued in Circular Memory 126 until enough data is present to comprise a discreet digital storage unit optimized for the type and capacity of the Digital Storage Media 105 present. When a discreet storage unit has been accrued, the Circular Memory 126 notifies the microprocessor 127 the storage unit is ready for storage. The microprocessor 127 then opens a DMA channel and the Arbitration Block 124 passes the storage unit on to FIFO 122. When the storage unit has been forwarded along the system bus to FIFO 122, the microprocessor 127 signals the Circular Memory 126 to reset its memory buffers to receive more formatted digital signal data as needed.

On output, digital signal data is passed to the Arbitration Block 124 from the FIFO 122 along the system bus to the Circular Memory 126 where it is temporarily stored in buffers and passed on to FIFO 120 for de-translation by the Format Translator 116. The retrieved data can be manipulated by the microprocessor 127 and the Arbitration Block 124 to produce several special data handling routines, such as multiple, simultaneous digital data streams or "trick play" effects such as PAUSE or FAST FORWARD.

The DMA Controller & Arbitration Block 130 provides the means to store and retrieve digital signal data, or execute complex, specialized data handling routines within the confines of the minimalistic embedded architecture of the present invention. Unlike the present art, these specialized, complex data handling routines of the present invention do not require that the digital signal data be separated or parsed into its sub-components prior to storage or retrieval (or conversely recombined) to provide multiple, simultaneous, independent digital signal streams for later control and arbitration. The digital signal data is reassembled in its entirety without secondary post-processing application layers. Additionally, because the native digital signal timing of continuous digital signals is preserved by the real-time nature of the recording process, the digital signal streams can be indexed in real-time internally within the present invention. [Note: Irregular digital signals require the insertion of timing data, or time-stamping, into the digital signal stream. (See FIG. 4.0 for example.)]

Due to the robust nature of the embedded file system and the multi-tasking, multi-threaded kernel resident in the microprocessor 127 and controlled by the Circular Memory 126 and the Arbitration Block 124 of the present invention, no external arbitration by peripheral components or an Operating System (OS) is required to achieve complex data handling routines, such as simultaneous playback and recording of multiple, simultaneous independent digital signal streams, unlike the present technology. This enables the entire process of storage, retrieval and complex arbitration of multiple, simultaneous digital signal streams to be conducted entirely within the embedded design of the present invention, thus minimizing microprocessor requirements.

The present invention has the ability to autonomously control and arbitrate high data rates—in excess of 60 Mb per second, for example. In the case of high bandwidth digital storage devices such as the HDD, data rates in this range are common. The present invention provides system designers the ability to define and optimize the number of simultaneous, independent digital data streams as a function of the Digital Storage Media 105. For example, a 7200 RPM HDD has a net bandwidth of approximately 60 Mb/sec. A system designer utilizing the present invention configured for a DV 25 application, which has a bandwidth requirement of 25 Mb/Digital Video stream, would allow for the arbitration of two simultaneous, independent digital signal streams of DV25 digital signal data. The embedded distributive architecture of the present invention ensures that the input and output components are autonomous. This provides the ability to simultaneously store while retrieving independent digital signal streams bi-directionally. This design element is incorporated in several present technologies as the process of "time-shifted recording" or "time-warping", where one input digital signal stream can be stored simultaneously as an input digital signal is being retrieved. If a system designer opted to utilize the same HDD but with a different configuration of the present invention for a High Definition (HD) application which has a specified data rate of approximately 19 Mb/sec, then three independent, simultaneous digital signal streams of HD digital signal data could be arbitrated for specialized feature sets.

The Arbitration Block 124 is a programmable hardware component of the DMA Controller & Arbitration Block 130, while the Circular Memory 126 is a fixed hardware component.

The Storage Interface Block 113 interfaces the present invention with an option of a plurality of external Digital Storage Media 105 options, such as but not limited to HDD; Solid State Memory and Optical Storage devices. The number of external Digital Storage media 105 concurrently interfaced with the present invention is a direct function of the nature and type of the digital device storage interface protocol utilized within the embedded architecture of the present invention. Since the Storage Interface Block 113 is programmable, a wide variety of digital device storage interface protocols can be programmed into this component, such as but not limited to ATAPI, PCMCI, USB, Serial ATA, and SCSI.

The Storage Control 125 prioritizes and executes requests received from the microprocessor 127 to store, index, search and retrieve digital signal data using industry standard commands common to the type of Digital Storage Media 105 utilized with the present invention. The Storage Control 125 executes pre-programmed instructions received via the microprocessor 127 from the Program EPROM 128 that detail how to organize and index stored data as well as track data errors in the context of the Digital Storage Media 105 and the file system endemic to the present invention.

When an input command request, such as "store" for example, is received by Storage Interface Block 113, specifically the Storage Control 125, from the Command Controls 131 via the Peripherals Control 129 and the microprocessor 127 to store digital signal data, task-specific modules of instructions embedded within the file system are sequentially executed by the multi-tasking, multi-threaded kernel of the microprocessor 127 of the present invention (see FIGS. 7-11 for working examples). The microprocessor 127 then directs the Storage Control 125 to locate available storage space on the Digital Storage Media 105. The Storage Control 125 notifies the microprocessor 127 when a storage location has been identified and resets Address Control 123 for the FIFO 122 to begin receiving pre-formatted digital signal data, or storage unit, accrued in the Circular Memory 126. The Address Control 123 coordinates the transfer of the storage unit with the Arbitration Block 124 between the Circular Memory 126 and the FIFO 122 until the storage unit has been stored on the Digital Storage Media 105. Once the storage unit has been stored on the Digital Storage Media 105, the Storage Control 125 notifies the microprocessor 128 that the storage unit has been received and resets the Address Control 123 to receive the next storage unit.

When a command or request to retrieve digital signal data stored on the Digital Storage Media 105 is received by the Storage Control 125, the digital signal data is first located in the index of the dynamic file allocation table (DFAT) endemic to the present invention and is referred to as a "file". ("File" for the purposes of the present invention, is defined as group of Digital Storage Media 105—specific storage units that collectively represent a discreet recorded event or data artifact"). Unlike the file allocation tables (FAT) of the present technology, the architecture of the DFAT of the present invention permits "bi-directional" searching of its table indices to significantly reduce the amount of computational power required by the present invention and dramatically increase its efficiency. Further, unlike the FAT of the present technology, the DFAT index is updated dynamically, or "on-the-fly", as data is stored on the Digital Storage Media 105 to greatly improve data security during the storing process. [Note: The DFAT and its components are detailed in the description of preferred embodiment of FIG. 6.]

Once the file has been located for retrieval by the Storage Control 125, the Address Control 123 is reset by the microprocessor 127 and the FIFO 122 can then begin to receive the digital signal data from the Digital Storage Media 105. The file is then transferred from the Digital Storage Media 105 to FIFO 122, coordinated by Address Control 123 and Arbitration Block 124 to the Circular Memory 126. When the Circular Memory 126 is full, the microprocessor 127 instructs the Format Translator 116 to reset the Address Control 121 and FIFO 120 begins receiving data. As the FIFO 120 temporary buffers become full the data is forwarded to the Format Translator 116 for "de-translation" back to the original native format of the digital signal. In this manner, the digital signal data of the file is continuously "streamed" from the Digital Storage Media 105 to the Storage Interface Block 113 to the DMA Controller & Arbitration Block 130 to the Conforming Interface Block 112 until the file has been retrieved.

The Firmware Logic/Control Block 140 provides the ability initiate the present invention through Command Controls 131 with basic commands, such as but not limited to PLAY and RECORD. Further, at any time during the storage or retrieval of any file, the digital signal stream, or "stream", can be controlled and arbitrated through by User Commands issued from the Firmware Logic/Control Block 140. User Commands such as FAST FORWARD, FAST REVERSE, BOOKMARK and PAUSE are examples of standard User Commands found in Command Controls 131.

The Firmware Logic/Control Block 140 also provides the ability to program the configurable components of the present invention through Program EPROM 128. User Commands are initiated by the Command Controls 131 and passed to the Peripheral Controls 129. The Peripheral Controls 129 has its own low-power local microprocessor that is programmed by instructions received from the microprocessor 127. These instructions are originally issued by the Program EPROM 128 to the microprocessor 127 upon powering up of the present invention. In this manner the user command interface, represented by the Command Controls 131, can be customized for any digital product, providing a wide array of feature sets and precise device control.

The control and arbitration of the digital signal "stream" itself is affected by the DMA Controller & Arbitration Block 130 through task-specific modules of instructions embedded within the file system. These instructions are issued by the microprocessor 127 and are sequentially executed by the multi-tasking, multi-threaded kernel of the microprocessor 127 of the present invention Specialized, task-specific data handling routines, such as storing and retrieving of multiple, simultaneous, bi-directional, independent digital signal streams can be efficiently arbitrated and controlled in real-time by the DMA Controller & Arbitration Block 130.

The present invention can accommodate the high data rates of any Digital Storage Media 105, such as a HDD. microprocessor 127 can issue multiple requests for the retrieval of the same digital signal data file, resulting in the retrieval of multiple, simultaneous, independent digital signal streams in proportion to the ability of the Digital Storage Media 105 to meet those requests. The limiting factor in the number of multiple, simultaneous independent digital signal streams on retrieval is the data rate capabilities of the Digital Storage Media 105 utilized.

On input the present invention can accommodate digital signal sources with very high data rates, such as DV25 which has a digital signal data rate of approximately 25 Mb/sec. Since the present invention operates in real-time, the limiting factor in the number of multiple, simultaneous independent digital signal streams to storage is the data processing capabilities of the microprocessor 127. Theoretically, the embedded distributive architecture of the present invention has no limits on the number of multiple, simultaneous independent digital signal streams to storage as the data processing requirements required by the present invention are extremely small. For example, in the examples presented herein of the present invention, microprocessor 127 is a generic 8051-type uP operating at 33 MHz and yet it achieves simultaneous, bi-directional streams of data rates in excess of 60 Mb/sec. If microprocessor 127 had far greater data processing capabilities, the present invention could process data rates far in excess of the examples presented herein. The microprocessor 127 type can be readily substituted with a more robust microprocessor to accommodate far more demanding digital signal processing applications.

The present invention is structured under the principles of an embedded distributive architecture so the input and output components are autonomous. This provides the ability to simultaneously store while retrieving independent digital signal streams bi-directionally. The present invention provides the system designers the ability to operate with considerably more simultaneous, bi-directional, independent digital signal streams than the simplex operation of time-shifted recording described herein. The present invention can be "scaled in parallel" to meet the very demanding digital real-time signal handling application requirements without the need for expensive, high-powered x86-type microprocessors to arbitrate multiple digital signal processing, as is the case with the present technology.

Since the present invention does not analyze the digital signal data in the course of committing it to storage, the computational requirements are minimal allowing for duplex (or more) operations, depending upon the computational power of the microprocessor utilized. The present invention can be scaled in parallel to meet more demanding digital signal applications by simply replicating the supporting hardware, such as the Format Translator 114 & 116; FIFO's 118, 120, 122 and Address Controls 119, 123, and 121, and the Circular Memory 126 proportional to the application demands and the computational speed microprocessor 127 utilized. In this manner exceptionally high data rates and a multitude of digital signal streams can be accommodated within the operational parameters of the present invention.

Since the present invention operates in discreet, autonomous input and output channels with a multitude of configurable simultaneous, independent digital data streams, a multiple digital data format, such as but not limited to DV25 and DV50 for example, can coexist and be simultaneously processed within the confines of the present invention. The present invention would require scaling of the hardware as described herein to support the additional application demands, but would be controlled and arbitrated by the DMA Controller & Arbitration Block 130 in substantially the same manner as previously described herein.

FIG. 3 illustrates the detailed embodiment of the present invention with SSP 111, configured to process data in the DV digital signal format. This example illustrates the present invention configured for a continuous digital signal type. SSP 111 signal processing design inputs, 8-bit signals in their native formats; identifies native signal format characteristics (scans); translates native signal into 16-bit word serial storage units common within the present invention (conform-to-storage); assembles and stores the common storage unit (controls) into memory until valid a file allocation unit is assembled; queries and transfers the common storage unit to and from storage (arbitrates); and translates the common storage unit back to its original native format for output (conforms-to-application). [Note: The number of bits analyzed and translated into word serial format is not restricted to the method in this example. The present invention can be configured to input any number of bits from a digital signal, such as but not limited to 16 or 128, and can translate said input signal into any number of bits in word serial format specified by the present invention for digital media storage.]

Typically, digital signal data is uniformly subjected to a generic signal translation process to provide interoperability with the multiple layers of processing that are inherent to the embedded design architecture of the present technology, such as the PCI Bus protocol layer, the hardware layer, Operating System layer, BIOS layer, and the Application layer. This requisite translation process of the present technology is computation intensive and unnecessarily complex for creating digital appliances, which typically embody narrowly defined operational parameters that do not require interoperability with a vast majority of the layers of processing embodied by the present technology. Generic digital signal translation processing conducted by the present technology cannot restrict or vet out superfluous or unnecessary digital signal translation processing for the purposes of simple storage and retrieval of digital signal data. Such generic digital signal processing is never optimized to the specific requirements of the application or the digital storage medium utilized without additional application layers to facilitate such supplemental digital signal processing. Unlike the present invention, the general purpose architectural specifications of the present technology do not include method and apparatus to restore native digital signal timing back to its original native format upon retrieval from digital storage devices without additional specific application layers to facilitate such supplemental digital signal processing.

An example of the generic translation of digital signal data into a format compliant with the digital signal requirements of the present technology is when any digital signal is received by a device utilizing the architectural specifications of the present technology it must first be pre-processed and translated to a format compatible with the industry standard PCI Bus protocol and its accompanying architectural specifications. This is but the first of many such "layers of processing" that are typically executed by digital devices utilizing the architectural specifications of the present technology to provide digital signal compliance. By utilizing an alternative design architecture which significantly reduces the overall architectural complexity, and by consequence the excessive computational requirements, the present invention eliminates the need for a vast majority of such supplemental layers of processing required by the present technology, such as the BIOS layer or the Operating System layer, thereby creating 'application specific' digital appliance devices optimized for the task at hand.

SSP 111 includes four separate block processes, Conforming Interface Block 112, DMA Controller and Arbitration Block 130, Storage Interface Block 113, and Firmware Logic and Control Block 140.

Native 8-bit real-time digital signal 103 is input to Conforming Interface Block 112 of SSP 111 through a common parallel interface. Native real-time digital signal 103 is in a format and digital signal type specific to the application. Such application specific formats may include, but are not limited to, MPEG, DV or HD, for example. The present inventions method and apparatus is described as follows for a continuous digital signal type and the DV digital signal format.

The logical operations of Conforming Interface Block 112 are programmed by the file system of the present invention in the manner previously described to be "format specific" to the application. Conforming Interface Block 112 performs two operations, input signal handling operations and output signal handling operations.

The Conforming Interface Block 112 has three primary functions. First, determine the start of native real-time digital signal (RTS) 103 using the Start of Frame Detector 114. Second, determine the inherent timing characteristics of RTS 103 using Start of Frame Detector 114. Third, Format Translator 115 must translate RTS 103 into a format common within the present invention.

In order to determine the start of valid digital signal data using the Start of Frame Detector 114, application specific firmware is programmed by Program EPROM 128 in the manner previously described herein to Conforming Interface Block 112 to identify the unique characteristics inherent to the particular digital signal format. In the case of DV digital signal format, the unique identifying characteristics of the native real-time digital DV signal will have been programmed into the logic of the Conforming Interface Block 112. The Start of Frame Detector 114 "scans" the incoming digital signal data to detect the digital signature of the continuous native real-time digital signal and specific data artifacts in order to find the start of the DV frame and its accompanying timing information. This involves Start of Frame Detector 114 scanning the DV signal for identifying SYNC signal to determine the timing of the signal, coupled with two specific bytes of data that are components of the DV standard format that characterize the "start of frame" for the DV signal format.

Once the start of digital signal data has been identified, application specific methodology and apparatus must be employed to associate and store the real-time digital signal timing information. Start of Frame Detector 114 provides the apparatus to identify the start of valid DV digital signal frame data since the intervals between the frames are continuous and as such once the start of the DV digital signal frame has been identified the timing between the first frame and the second frame will remain continuous. The digital signal timing is preserved in real-time since the data is forwarded to temporary buffers FIFO 118, Circular Memory 126 and FIFO 122 to eventual storage all conducted in real-time.

Continuing in the example of a DV continuous bit rate transmission, the present invention scans the DV signal transmission to identify its digital signature, a specific data artifact with an accompanying sync signal, to indicate the start of the DV signal frame. The DV signal frame is then read until the next stat of frame is located. As frames are identified, they are counted and tracked in memory registers with 'pointers' until a specific number of frames is reached and the DV frames are be accrued in the FIFO 118 temporary buffer and further committed to storage—in real-time. Consequently, digital signal data is stored exactly as it is received, inclusive of its inherent native "frame rate" or digital signal timing.

Once the Conforming Interface 112 components have identified both the beginning of valid digital signal data and its inherent native timing, the digital signal data is ready to be translated into a format common within the present invention. The programmable Format Translator 115 is designed to provide compliance to a format common within the present invention specifically for DV signals. Format Translator 115 is monitored by the Address Control 119 and arbitrated in turn by a low power microprocessor, microprocessor 127. An inexpensive 8051-type 33 MHz microprocessor is usable for microprocessor 127 to accommodate digital signal applications with data rates in excess of 60 Mb/sec.

Upon successful detection of the "start of frame" by the Start of Frame Detector 114, the 8-bit native signal data is then continuously "translated" into 16-bit "word-serial" to conform to the specifications of a "data storage unit" (DSU) common within the present invention. The DSU format is pre-determined to be the optimal data storage unit for the Digital Storage Media 105 and the specific digital signal format, such as DV, and digital signal type, such as continuous, used for the application. In this example a HDD is utilized and programmed into the Conforming Interface 112 by the Program EPROM 128. The common data format within SSP 111 is 16-bits in this example, while the signal data may be 8 or even 1 bit wide. This common format is timing-independent so all time-related information of RTS 103 will be normalized by real-time storage process described herein conducted by Conforming Interface Block 112.

The DSU is then buffered into a small temporary registry FIFO 118. Data passes through FIFO 118 and is monitored by the Address Control 119 to keep track of the memory address locations and notify the microprocessor 127 when the temporary buffer in FIFO 118 is full. The microprocessor 127 resets the Circular Memory 126 and the DSU is then transferred along a serial bus common within the present invention to the Circular Memory 126 in the DMA Control and Arbitration Block 130 where it is assembled into pre-programmed storage units called Dynamic File Allocation Units (DFAU's). DFAU's are optimized for the particular Digital Storage Media 105 utilized and its storage capacity.

Once the native RTS 103 has been translated into a DSU, it is passed through the system bus to the Circular Memory 126 in the DMA Controller and Arbitration Block 130. There are several fundamental methods embodied in this process. The DSU is comprised of discreet complete "frames" of digital signal data as its subset. Circular Memory 126 accrues one DSU of data at a time in the buffer before receiving the next DSU into buffer from the FIFO 118. This prevents data in Circular Memory 126 from being over-written. Arbitration Block 124 governs whether to call in another DSU of data from the FIFO 118 on the Conforming Interface Block 112 and when to halt the influx of DSU data to the Circular Memory 126. In this example, this process ensures that the optimal DFAU size will always in multiples of 512 bytes of data will be realized since this is the optimal data size for a HDD. In this method, a DSU conveniently fits in groups of the smallest storage unit, or sector, in the example of a HDD Digital Storage Media 105.

Conforming Interface Block 112 is programmed to 'know' when Circular Memory Block 126 should re-circulate after a specific number of frames N has been accrued. When the address for frame N is reached, Conforming Interface Block 126 will roll the next starting address in the Address Control 126 to that of frame 1. Once an adequate number of frames are accrued in Circular Memory 126 buffer, a transfer of the DFAU is initiated through a DMA channel opened by Arbitration Block 124 and then arbitrated to FIFO 122 in Storage Interface Block 113 for actual storage on Digital Storage Media 107.

Storage Interface Block 113 must mediate the commands issued by microprocessor 127 to ensure that requests to stored data are done in an efficient manner so as to avoid the over-writing of accrued DFAU data in Circular Memory Buffers 126. Likewise it must grant access to data that has been stored and regulate the influx and outflow of data simultaneously. There are several fundamental methods embodied in this process. First, Storage Interface Block 113 accepts incoming DFAU data off the serial bus using standard DMA channel commands sent from Arbitration Block 124 in DMA Controller and Arbitration Block 130 to FIFO 122 registry. Arbitration block 124 monitors the progress of this transfer process in multiples of 16 bytes of data, as has been optimally pre-programmed for the particular type and capacity of Digital Storage Media 105 utilized.

In the DMA Control and Arbitration Block 130, the DSU's are now accrued in Circular Memory 126 and arbitrated by Arbitration Block 124 which counts the frames until there is sufficient data to comprise a DFAU. When a discreet DFAU is completed, Arbitration Block 124 notifies μProcessor 127 that the DFAU is ready for transfer along the serial bus to FIFO 122. Then μProcessor 127 notifies Storage Control 125 to locate available storage on the Digital Storage Media 105 and waits for Storage Control 125 to notify microprocessor 127 to send the DFAU.

When Storage Control 125 notifies μProcessor 127 that a storage location has been identified and to send the DFAU, μprocessor 127 resets Address Control 123 in the Storage Interface Block 113 and the DFAU is ready to be forwarded to FIFO 112. The DFAU is then arbitrated from Circular Memory 126 by Arbitration Block 124 and passed to FIFO 122 and monitored by Address Control 123 for commitment to storage to the in Digital Storage Media 105 using a standard protocol such as, but not limited to the ATAPI standard protocol. The DFAU is then entered into the Dynamic File Allocation Table (DFAT) index for a record of the location of the DFAU on the Digital Storage Media 105.

Storage Interface Block 113 has been programmed via application specific software in the manner previously described herein to conform to the definition of the interface standard used with the Digital Storage Media 105 utilized. An example where the Digital Storage Media 105 is an IDE HDD, the conforming interface standard would be the ATAPI standard protocol.

FIG. 4 illustrates the detailed embodiment of the present invention with SSP 111, configured to process irregular digital signal data in the MPEG digital format. SSP 111 signal processing design inputs digital 8-bit signals in their native formats; identifies native signal format characteristics (scans); executes time stamp insertion into the digital signal stream (time notation); translates native signal into 16-bit word serial storage units common within the present invention (conform-to-storage); assembles and stores the common storage unit (controls) into memory until a valid file allocation unit is assembled; queries and transfers the common storage unit to and from storage (arbitrates); and translates the common storage unit back to its original native format for output (conforms-to-application). SSP 111 includes four separate block processes: Conforming Interface Block 112, DMA Controller and Arbitration Block 130, Storage Interface Block 113, and Firmware Logic and Control Block 140.

In the example of an irregular digital signal MPEG transmission, the present invention scans the input native RTS 103 MPEG data transmission to identify its digital signature and locate a specific data artifact with its accompanying SYNC signal, to indicate the first byte of a MPEG data packet. Once the first byte is identified the packets timing information is then annotated "time-stamped" by inserting four bytes of time code data into the digital signal stream. As packets are identified and time-stamped, they are counted and tracked in temporary memory registers with 'pointers' until a specific number of packets is reached and the MPEG packet data can be accrued to fulfill DFAU requirements and further committed to storage—all executed in real-time. Consequently, digital signal data is stored exactly as it is received, inclusive of its inherent native "packet rate". Upon retrieval, the time stamp previously inserted into the MPEG data packet is read and removed. The MPEG data packet is then re-synchronized with an external clock generator prior to output. In this manner, digital timing is restored to the native MPEG digital signal format in which it was originally stored.

Native 8-bit RTS 103 is input to Conforming Interface Block 112 of SSP 111. The digital native RTS 103 is in a format specific to application requirements. Such application specific formats may include, but are not limited to, MPEG, DV25 or HD, for example. The present inventions method and apparatus is described as follows for an irregular digital signal in the MPEG digital format.

The logical operations of Conforming Interface Block 112 are programmed by the Program EPROM 128 in the manner previously described herein of the present invention and are "format specific" to application requirements. Conforming Interface Block 112 in itself performs two operations, input signal handling operations and output signal handling operations. To accomplish these two operations, Conforming Interface Block 112 must first accomplish the three primary functions. First, determine the start of the digital native RTS 114. Second, annotate timing information into the digital signal stream by inserting "time stamps" to the actual digital signal data packets. Lastly, translate the native real-time digital signal into a format common within the present invention. In order to determine the start of valid digital signal data, application specific methodology must be employed to identify the unique characteristics-inherent to the particular digital signal format.

In the example of an irregular digital signal in the MPEG digital format, the unique identifying characteristics of the native real-time digital MPEG signal will have been programmed by the Program EPROM 128 in the manner previously described herein into the logic of Conforming Interface Block 112 to "scan" incoming signals for SYNC signal and specific data artifacts in order to find the first byte of a MPEG packet to determine its accompanying timing information. In case of MPEG, the packets are scanned by the Word Serial 114A to determine the first byte of an MPEG packet signal 103 with a value of 47x, coupled with an identifying SYNC signal. Once the start of digital signal data has been identified, application specific methodology and apparatus must be employed to associate and store the real-time digital signal timing information in real-time.

Word serial 114A and the Time Stamp 115A work in concert to scan and measure the native real-time digital signal and translate it into a format common within distributive architecture of the SSP 111. Since there is no continuous timing signature inherent to the MPEG format, the native real-time digital signal is also then time-stamped by 115A with 4 bytes of time-code data added to the existing 188 bytes of valid MPEG digital signal data for a total of 192 bytes per MPEG packet, to provide time synchronization to the MPEG signal.

Once Conforming Interface 112 components have identified both the beginning of the valid digital signal data and its inherent native timing, the digital signal data is ready to be translated into a format common within the present invention. Word Serial 114A is programmed in the manner described herein to provide compliance to the specifications for each native signal application and its requirements, such as MPEG.

Word Serial 114A is monitored by Address Control 119 and in turn by a low power, microprocessor 127. The 8-bit native signal data is then continuously "translated" into 16-bit "word-serial" format to conform to the specifications of a "data storage unit" (DSU) common within the present invention. The common data format within the SSP 111 is 16-bits while the signal data may be 8 or even 1 bit wide. This common format is timing-independent so all time-related information of RTS 103 will be normalized by real-time storage process described herein conducted by Conforming Interface Block 112.

The DSU is then buffered into a small temporary registry FIFO 118. Data passes through FIFO 118 and is monitored by the Address Control 119 to keep track of the memory address locations and notify the microprocessor 127 when the temporary buffer in FIFO 118 is full. The microprocessor 127 resets the Circular Memory 126 and the DSU is then transferred along a serial bus common within the present invention to the Circular Memory 126 in the DMA Control and Arbitration Block 130 where it is assembled into pre-programmed storage units called Dynamic File Allocation Units (DFAU's). DFAU's are optimized for the particular Digital Storage Media 105 utilized and its storage capacity.

[Note: The processes described in this MPEG example dealing with the both Storage Interface Block 113 and DMA Controller & Arbitration Block 130 are identical to that of the DV example previously described herein.]

Once the native RTS 103 has been translated into a DSU, it is passed through the system bus to the Circular Memory 126 in the DMA Controller and Arbitration Block 130. There are several fundamental methods embodied in this process. The DSU is comprised of discreet complete "frames" of digital signal data as its subset. Circular Memory 126 accrues one DSU of data at a time in the buffer before receiving the next DSU into buffer from the FIFO 118. This prevents data in Circular Memory 126 from being over-written. Arbitration Block 124 governs whether to call in another DSU of data from the FIFO 118 on the Conforming Interface Block 112 and when to halt the influx of DSU data to the Circular Memory 126. In this example, this process ensures that the optimal DFAU size is always in multiples of 512 bytes of data since this is the optimal data size for a HDD. In this method, a DSU conveniently fits in groups of the smallest storage unit, or sector, in the example of a HDD Digital Storage Media 105.

Conforming Interface Block 112 is programmed to 'know' when Circular Memory Block 126 should re-circulate after a specific number of frames N has been accrued. When the address for frame N is reached, Conforming Interface Block 126 will roll the next starting address in the Address Control 119 to that of frame 1. Once an adequate number of frames are accrued in Circular Memory 126 buffer, a transfer of the DFAU is initiated through a DMA channel opened by Arbitration Block 124 and then arbitrated to FIFO 122 in Storage Interface Block 113 for actual storage on Digital Storage Media 107.

Storage Interface Block 113 must mediate the commands issued by microprocessor 127 to ensure that requests to stored data are done in an efficient manner so as to avoid the over-writing of accrued DFAU data in Circular Memory Buffers 126. Likewise it must grant access to data that has been stored and regulate the influx and outflow of data simultaneously. There are several fundamental methods embodied in this process. First, Storage Interface Block 113 accepts incoming DFAU data off the serial bus using standard DMA channel commands sent from Arbitration Block 124 in DMA Controller and Arbitration Block 130 to FIFO 122 registry. Arbitration block 124 monitors the progress of this transfer process in multiples of X bytes of data, as has been optimally pre-programmed for the particular type and capacity of Digital Storage Media 105 utilized.

In the DMA Control and Arbitration Block 130, the DSU's are now accrued in Circular Memory 126 and arbitrated by Arbitration Block 124 which counts the frames until there is sufficient data to comprise a DFAU. When a discreet DFAU is completed, Arbitration Block 124 notifies microprocessor 127 that the DFAU is ready for transfer along the serial bus to FIFO 122. Then microprocessor 127 notifies Storage Control 125 to locate available storage on the Digital Storage Media 105 and waits for Storage Control 125 to notify microprocessor 127 to send the DFAU.

When Storage Control 125 notifies microprocessor 127 that a storage location has been identified and to send the DFAU, microprocessor 127 resets Address Control 123 in the Storage Interface Block 113 and the DFAU is ready to be forwarded to FIFO 112. The DFAU is then arbitrated from Circular Memory 126 by Arbitration Block 124 and passed to FIFO 122 and monitored by Address Control 123 for commitment to storage in Digital Storage Media 105 using a standard protocol such as, but not limited to the ATAPI standard protocol. The DFAU is then entered into the Dynamic File Allocation Table (DFAT) index for a record of the location of the DFAU on the Digital Storage Media 105.

Storage Interface Block 113 has been programmed via application specific software in the manner previously described herein to conform to the definition of the interface standard used with the Digital Storage Media 105 utilized. An example where the Digital Storage Media 105 is an IDE HDD, the conforming interface standard would be the ATAPI standard protocol.

Upon output or retrieval, Conforming Interface Block 112 executes the reverse of the above described process, de-translating the DFAU back to the original native digital signal format. In addition to de-translating the common signal back to its native format, certain time correction processes, such as clock adjust 130 are necessary. In the example of MPEG digital signal data, timing adjustments are made to synchronize the stored data with the output of the original real-time, native RTS 104. Since native MPEG digital signal data is irregular by nature and time stamping was required to originally preserve the MPEG digital signal's timing information when said digital signal was stored, the same time stamp data must now be removed from the MPEG digital signal data to preserve its native format upon retrieval.

Address Control 121 and Time Stamp Counter 134 are reset to zero by microprocessor 127 prior to DFAU signal data being received by FIFO 120. Arbitration Block 124 and Address Control 121 then arbitrate the submission of the MPEG data to FIFO 120, byte by byte, to Registry 132 where it is submitted to the A/B Compare 133 where the MPEG packet data is accrued until it reaches a value of 188 bytes. In this manner the 4 bytes of time stamp data that were originally inserted during storage are not added to the MPEG digital signal data upon retrieval and discarded and the process is repeated in real-time.

FIG. 5 illustrates the detailed embodiment of the present invention with two diagrams comparing different application specific format translators. The example of the DV format translator is configured for a continuous digital signal type, processing the DV digital signal data format for both input and output. The example of the MPEG format translator is configured for an irregular digital signal type, processing the MPEG digital format for both input and output. Both of these examples have been described previously herein.

FIG. 6 illustrates a high-level overview of the method of the present invention and the five logic blocks residing within the multi-tasking, multi-threaded kernel that comprise the firmware apparatus and methodology of the present invention. They are as follows: Host/User Interface Command Protocol (Block 1), Conforming Interface Input/Output Controls (Block 2), Streaming Controls (Block 3) Time Code Controls (Special Effects) (Block 4) and File System Management Controls (Block 5).

The Host/User Interface Command Protocol (Block 1) provides control functions over SSP 111 via Command Controls 131 and Peripheral Controls 129, such as the LCD and control buttons, and actuated through the microprocessor 127. Industry standard Interrupt Request Query (IRQ) commands are used to managed and negotiate the continuous scanning of the input/output ports utilized to provide device control over the present invention and its derivative digital products. When an IRQ is received, microprocessor 127 decodes the command and executes the response to the various embedded components of the SSP 111. These input/output IRQ's are the driving commands behind the user's manipulation of a digital product embodying the present invention.

The Conforming Interface Input/Output Controls (Block 2) embedded in an integrated circuit (IC), such as an FPGA or ASIC, and is programmable and customizable for each specific application, depending upon the applications format requirements. The central tasks of Conforming Interface Input/Output Controls (Block 2) is to configure, monitor and control the scanning; identification and annotation of digital signal timing; and format translation of native real-time digital signals 103/104 in and out of Conforming Interface Block 112 and its subcomponents. When a digital signal is sensed on the input port of the Conforming Interface Block 112, an IRQ command is issued to the microprocessor 127. Then microprocessor 127 issues application specific commands to Format Translator 115 and Start of Frame Detector 114 to begin their task-based sub-routines. When the digital signal ends, a 'clear" command is sent to Address Control 119 to clear its buffers and then it enters a "ready state" to wait for the next signal. When a IRQ command for data is received from Command Control 131 or Peripherals Controls 129 to retrieve a stored continuous digital signal, microprocessor 127 issues application specific commands to Format Translator 116 and Clock/Sync adjust 130 (or whatever timing subcomponent is called for by the application) to begin their routines. When the signal ends, a 'clear" command is sent to the Address Control 121 to clear its buffers and then it enters a ready state to wait for the next signal.

The Streaming Control (Block 3) is embedded in an integrated circuit (IC), such as an FPGA or ASIC, and is programmable and customizable for each specific application, depending upon the applications format requirements. The Streaming Control (Block 3) provides the actual management control process of inputting or outputting data to and from the Digital Storage Media 105. This control process is done entirely by this firmware block. Streaming Control (Block 3) monitors FIFO's 118, 120, and 123 metering buffer usage to determine when to store or retrieve data to and from Digital Storage Media 105. Streaming Control (Block 3) issues the commands to the various hardware components to begin their assigned tasks. When a conditional command is received that FIFO 118 has a full buffer, microprocessor 127 coordinates operations between Address Control 119, Circular Memory 126, Arbitration Block 124, to receive data from FIFO 118. Simultaneously, it coordinates operations between Address Control 123, FIFO 122 and HDD Control 125 to receive data from Circular Memory 126. Industry standard DMA channels are utilized to negotiate the data transferred on the serial system bus to Digital Storage Media 105. Streaming Control (Block 3) further ensures that all hardware subcomponents are ready to receive data and that the timing and coordination between hardware subcomponents is optimal in the manner previously described in the description of Conforming Interface Input/Output Controls (Block 2). Stream Control (Block 3) can issue multiple, commands to the hardware subcomponents to generate and/or control multiple bi-directional streams of identical data. Each stream of data can also be asynchronous with another, with each stream of data having its own unique timing sequence with some input from Time Code Controls (Special Effects) (Block 4). (This process is known in the present technology as being 'time-shifted'.).

The Time Code Controls (Special Effects) (Block 4) are embedded in an integrated circuit (IC), such as an FPGA or ASIC, and is programmable and customizable for each specific application, depending upon the applications format requirements. The Time Code Controls (Special Effects) (Block 4) provides application specific digital signal stream controls related to the synchronization and timing of the digital signal data stream internally in SSP 111. Typically such specialized controls are used to provide special functionality, such as fast forward or fast reverse. These control functions can best be described as "specialized data handling", enabling advanced features that otherwise would not be able to be accomplished with the digital signal data in its native format. When a request is received by microprocessor 127 from Peripheral Controls 129 to "pause" a data stream, the timing of the data stream must be altered in such a manner as to provide the desired special effect. In this instance, microprocessor 127 issues a command to Address Control 121 not to refresh its buffer and repeat last frame of data in FIFO 120 in real-time to render the effect that the image is frozen, when in effect it is being replayed over and over.

The File System Management Controls (Block 5) are embedded in an integrated circuit (IC), such as an FPGA or ASIC, and is programmable and customizable for each specific application, depending upon the applications format requirements. The File System Management Controls (Block 5) is central to the process of actually storing and retrieving the data onto Digital Storage Media 105. In order to actually store data on Digital Storage Media 105, a discreet storage unit must be defined. The value for an optimal storage unit is dependent on not only the physical nature of Digital Storage Media 105, but also the nature of the digital signal type and format—or "what" is being stored. Consequently, this process is considered highly application specific. This process is referred to as "file system initialization" and is comprised of, but not limited to, the following considerations: for example, Disk Capacity, Minimum Seek Time, Data Format (DV; MPEG; NTSC; PAL; etc.), and the optimum ability to locate free space, or the physical and logical characteristics of the Dynamic File Allocation Unit (DFAU). Further, File System Management Controls (Block 5) can simultaneously control and arbitrate multiple Digital Storage Media 105 and store and retrieve multiple different digital signal formats simultaneously.

The optimal parameters for file system initialization are application specific and as such are endemic to general SSP 111 device configuration. File system initialization is conducted when the Digital Media Storage 105 is powered on. Once the file system has been initialized, Digital Storage Media 105 is ready to scan its Dynamic File Allocation Table (DFAT) for available DFAU's to store digital signal data. When available DFAU's for storage are located, Storage Control 125 sends a "ready to receive" command to microprocessor 127 and Digital Storage Media 105 is then ready to begin to receive digital signal data. Then microprocessor 127 coordinates a data transfer along a DMA channel on the system serial bus with the Streaming Control (Block 3) and initiates a 'send data' command to begin transferring digital signal data to Digital Storage Media 105.

The five Firmware Logic/Control Blocks as shown in FIG. 6, comprise general groupings of "task-based sub-routines" that comprise the firmware apparatus and methodology of the present invention. Within each of these Firmware Logic/Control Blocks are sets or "modules" of executable instructions initiated when a command is initiated from the Command Controls 131 in the Firmware Logic and Control Blocks 140. Each command is received by the microprocessor 127 and subsequently executed by its embedded multi-tasking, multi-threaded kernel that administrates and actuates the file system as a separate "thread" or process.

Further, the present invention can be readily configured to accommodate the handling of multiple, simultaneous native real-time digital signals or "tasks", by the application specific software in conjunction with the programmable logic blocks utilizing minimal microprocessing or computational power.

The driving component behind the operation of the distributive processing architecture of the present invention is its file system and accompanying multi-tasking, multi-threaded kernel. The file system is a set of programmable instructions which provide the logical operations necessary to configure the independent distributive processing architectural components of present invention for a specific application. The file system provides fundamental services such as task scheduling, message passing, and memory allocation and management that require minimal computational resources. The multi-tasking kernel provides specialized control routines, bundles of the fixed instructions passed from the file system in the form of "modules" or task-based sub-routines. These modules are designed to provide specialized device control functionality, and coordinate and interface between different tasks (including simultaneous tasks), devices and system resources under specific operational parameters, such as simultaneously managing multiple digital signals.

Essential to the functionality of the multiprocessing kernel of the present invention is the use of its multiple "threads"—modules or task sub-routines that work together to achieve the desired result of an overall specific task. For example, if the desired task is to retrieve stored digital signal data from a HDD, applicable modules of the multi-tasking kernel would be "seek" and "read". For the purposes herein, a thread is a single sequential flow of control within a program; it is a sequence of instructions that are executed within a process or task. A thread does not have to be the smallest possible complete section of instructions within a program, but merely an independent sequence that does not depend on other sequences, at least not entirely, in order to run at any point in time without regard to any other currently running threads or processes. It is a single, dedicated logical process operating with the parameters of a distributive processing architecture. Because of this, a thread can be split off to run on different microprocessors, running in serial or in parallel to other threads without affecting its function.

In the present invention, microprocessor(s) execute several tasks (and numerous threads) simultaneously and perhaps at speeds comparable to that when only a single task is running. This results in microprocessors spending much time idle. To enable a microprocessor to support simultaneous execution of several tasks it must rapidly switch between these different tasks, in a 'round-robin' (cyclical) fashion—particularly in the case of narrowly focused, application specific digital devices. These tasks are typically executed sequentially and the "time slice" given to each must be relatively short, of the order of a tenth of a second or less. In the present invention, common system tasks, such as memory management, are highly optimized in hardware and do not require the use of a software-based real-time clock. However, the support of some specialized system tasks requiring inordinate control operations, such as managing simultaneously managing multiple digital signals, does incorporate the use of a real-time clock embedded as fixed instructions in the file system. To support this operation the real-time clock utilizes an "interrupt command" to stop the microprocessor at regular intervals to enable the microprocessor to switch between tasks. When an interrupt occurs, the microprocessor stops what it is doing; saves the memory values of the various address control registers; and then executes a system procedure to perform a switch of operations. When returning to the original task, the registers are restored to the memory values appropriate to the original task. Multiprocessing kernels inherently must place significant constraints on how the system resources must be scheduled to prevent accidental data loss. For example, a HDD performing "seek" functions, followed by "read and write" operations for various users, must interleave the requests in such a way as to avoid mixing the data.

Consequently, since the highly optimized, multi-tasking kernel of the file system of the present invention has been designed to ensure that minimal computational demands are placed upon it, it can be easily configured for additional parallel duplex digital signal management operations—without unduly increasing the computational resources. For example, with the present use of an inexpensive 8051-type 33 MHz microprocessor by the illustrated embodiment of the present invention, duplex operation running parallel tasks can be configured by simply duplicating the requisite digital signal processing hardware to accommodate multiple digital signal input and outputs and configuring the file system to address the redundant hardware. If even further scaling of the architecture is required by a specific application, matching the proper low-power microprocessor to the computational requirements is easily accommodated.

The present invention provides a method and apparatus whereby the application specific software can configure and regulate a customizable file system, which defines the operational parameters, required to store and retrieve specific native formats of digital signal data-types. The file system of the present invention achieves a highly optimized balance between the characteristics of the native digital signal data-types; the type and volume of the digital storage medium being utilized; and the most efficient algorithmic means of defining a File Allocation Unit (FAU) Table entry for digital signal data storage and retrieval—for each application. The file system embodied in the present invention incorporates the use of dynamic file allocation units (DFAU), rather than the fixed FAU values incorporated under the FAT32 file system utilized by the present technology. Typically, the FAU of the present technology is assigned a fixed value or size measured in kilobytes, such as 64 Kb, to accommodate the plethora of data-types that the FAU is required to accommodate general purpose architectures, most of which are quite small. Consequently, changing the FAU to accommodate applications requiring optimal storage and retrieval operational parameters is a complex and somewhat inflexible task. The DFAU of the present invention is highly customizable and data-type dependent, permitting a very high degree of optimization to create a significantly more efficient means to store and retrieve digital signal data for application specific tasks.

This unprecedented flexibility in the assignment of optimal DFAU size greatly enhances the present inventions ability to optimize the digital storage requirements for each specific application. For example, in the case of determining the best operational parameters for storing and retrieving Digital Video (DV) frame data in the NTSC signal standard protocol to and from a 40 GB HDD, we would rightly assume that the actual size of the DFAU would need to be large since the size of video data files tend to be exceptionally large, unlike that of a text document. Further, given that video files are so large that a single 'file' could fill the entire volume of the 40 GB HDD, we must determine the DFAU Table entry requirements from the smallest unit of DV signal frame data, a single frame. However, since the rate of transmission of the DV signal data would be quite high, we will need to qualify it in terms of interval—in this case no less than one second during which we would need to store thirty (30) frames. Since we know from industry standards that a single frame of NTSC compliant DV signal frame data is approximately 120,000 bytes, one second of DV signal frame data would require 3,600,000 bytes or 3,600 KB of storage. We then compare our storage requirement for the DV signal frame data to the optimal digital storage unit that the 40 GB HDD was optimally designed to support, in this case 512 bytes per sector. If a single discreet NTSC compliant DV signal data frame has a value of 120,000 bytes, then we know we will require approximately 235 sectors or 120,320 bytes of storage for every DV frame of data. Consequently, our DFAU Table entries must conform to multiples of 235 sectors. Because DV frame data can vary in size (in bytes) we must determine the 'best-case' for determining the optimal FAU per given digital storage media. In this example, since we are viewing one second of DV signal frame data, a frame being the least common denominator for this application, then we must look to determine our ideal DFAU as having a value of approximately 4 MB which would accommodate 33 frames of DV signal data. By utilizing the following formula:

Number of DFAU Table Entries=HDD Capacity/ DFAU Size, or 1000 DFAU Table Entries=40 GB/4 MB The above formula allows determination of an optimal DFAU table for the above example will have approximately 1000 DFAU Table entries. For data-types very large in size, the optimized DFAU size has significant benefits over the present technology. For example, if the same example was applied to the present technology utilizing a FAT32 file system with 64 KB FAU as being representative of the FAT32 Table entries, rather than the 4 MB DFAU Table entries of the present invention, there would be 6,250 FAU entries utilizing the FAT32 file system of the present technology to store the same DV signal data. Since the above formula clearly illustrates the interdependence between DFAU size, storage capacity and the number of DFAU entries, utilizing the file system of the present invention we can somewhat arbitrarily select the variables that are most important to a particular application and optimize around those considerations accordingly. For example, if it is determined that an 80 GB HDD is required rather than a 40 GB HDD, but additional DFAU entries are deemed inefficient, then the DFAU size can simply be increased to 8 MB.

Such architectural design considerations are routinely important when developing robust, fault tolerant storage and retrieval architectures where searching the stored data is crucial, especially storing and retrieving data at very high data rates, but the limitations of the present technology has offered few constructive alternatives. The file system of the present invention is designed to be highly fault tolerant by contrast. To ensure data security, the file system dynamically verifies whether the file system integrity is valid or not, thereby ensuring that errors do not corrupt the DFAU resulting in data loss. Approximately every two seconds, the DFAU Table is 'updated' dynamically on each 'write' process. This ensures that all data would be retained in the event of a loss of power within a two second span. The methodology of the present technology does not provide similar assurances without additional specific applications layers providing such tasks.

A significant benefit of the customizability of the file system of the present invention is the ability to export digital signal data compliant with industry standard file systems. The file system can be configured so that archived data can be translated and exported to accommodate the architectural requirements of other industry file systems, such as FAT32. This conversion process is accomplished with the exact same method and apparatus for translating digital signal data described herein with the sole addendum of supplementing the translation parameters required by the file system to read the archived data is it is being exported to. Typically these supplemental translation parameters amount too little more than the FAU parameters for the target file system.

The present invention embodiment includes the ability to search the DFAU Table bi-directionally. The file system of the present invention, as well as that of the present technology, "links" DFAU/FAU's when stored data spans multiple DFAU/FAU Table entries. These can be contiguous or non-contiguous DFAU/FAU's. Such "linklets" are essentially a series of pointers that are written to the FAU indicating the next logical FAU address to be serially read. In the present invention the use of double linklets allows for the reading of the DFAU Table entries in either direction, from the top-to-the-bottom or from the bottom-to-the-top. The present invention achieves this unique feature by writing two linklets to the DFAU, one indicating the next logical DFAU and one indicating the prior logical DFAU. Comparatively, the file system utilized by present technology, typically FAT32, can read the FAT32 table entries in only one direction, from the top down, processing a single linklet. Consequently, there is a significant difference between the computational requirements of the file system of the present invention and that of the present technology. Typically, this process of "Logical Block Allocation" (LBA) determination in the present technology is extremely calculation intensive given the large number of FAU entries involved in the FAT32 file system—especially when addressing non-contiguous FAU's. For example, if we refer back to our prior example involving DV signal frame data and a 40 GB HDD, to conduct a simple search of a file system utilizing the FAT32 architecture of the present technology, it would require 625 discreet search operations to every one (1) under the DFAU architecture of the present invention given the difference in the FAU size compared to that of the DFAU size of the present invention. Compounding that fact are the significantly fewer overall DFAU entries as compared to those FAU entries of the present technology, as well as the ability of the present invention to search the DFAU table bi-directionally. This robust feature of the present invention increases the read speed and efficiency for the digital storage media allowing for extremely robust handling of real-time digital signal data not found in the present technology, while reducing exponentially the number of potential disk errors and possible device failure.

FIGS. 7.0 through 11.0 illustrates a high-level overview of the process of logical operation of the firmware of the present invention when a "RECORD" (or "PLAY") command is issued by a User from the Command Controls 131 or Peripheral Controls 129. This diagrammatic overview of the operation of the present invention illustrates the interaction between the logical operations of the task-based subroutines in each of the five Firmware Logic/Control Blocks of FIG. 6.0 and the various hardware sub-components of the present invention.

FIG. 7.0 illustrates the firmware initialization and the "power-on" cycle of the present invention, the figure numerals refer to apparatus in FIG. 2. Command Controls 131 initializes the hardware components and initiates the search by microprocessor 127 for a valid firmware signature. This sub-routine validates the current device configuration as being operational and initializes the HOST Interface Peripheral Controls 129. Then microprocessor 127 reads the file system and initializes the file system to configure the file system kernel to begin digital signal translation.

FIG. 8.0 illustrates the Kernel Start process, the figure numerals refer to apparatus in FIG. 2. The multi-tasking, multi-threaded kernel of the file system is optimized to discern between two logical operations: Command Determination, (when a new command is received by the kernel it is passed to the command handler for decoding); and, Task Scheduling Determination, (when a current active task is received by the kernel it is passed to the task handler & scheduler for task assignment and scheduling. If no new commands are present or current tasks active, then the kernel monitors the power switch state and passes the signal back to the beginning of the Kernel Start process. This entire process is endemic to the file system of the present invention.

FIG. 9.0 illustrates the Command Handler process. When a new command is received from Command Controls 131 or Peripherals Controls 129, it must first be verified as a valid command and then decoded by the Microprocessor 127. Once the command has been decoded, the command line bytes are then read by microprocessor 127. This provides the information microprocessor 127 needs to match the command received with the proper command line sub-routine associated with the task required by the command bytes. Once the proper command line sub-routine has been identified by the microprocessor 127, it is passed to the appropriate Firmware Logic/Control Blocks (1-5) and the associated module(s) of task-based subroutines are executed, in this case: RECORD.

FIG. 10.0 illustrates the command line sub-routine: RECORD, the figure numerals refer to apparatus in FIG. 2. In the example of the task module for the RECORD sub-routine, microprocessor 127 issues "threads" of executable instructions to Address Control 123 and Storage Control 125 to read the file system directory to determine if the file the User wants to RECORD already exists. If the file exists, the file is appended. If the file does not exist it is created. Once the file recording method has been established, microprocessor 127 begins to send tasks and the associated task-based subroutines and its threads to the various components of the SSP 111, as described previously herein, to configure the hardware of the present invention to RECORD digital signal data. Then microprocessor 127 begins to execute a list of "current tasks" and their associated task-based subroutines to begin the RECORD process. Then microprocessor 127 sequentially passes commands back to the Kernal Start (FIG. 8.0) process where they are received as "current tasks" and passed to the Task Handler & Scheduler for further processing.

FIG. 11.0 illustrates the Task Handler & Scheduler, RECORD. (Note: Since the process of storing and retrieving digital signal data is closely aligned, both PLAY and RECORD are diagrammatically represented in FIG. 11.0). The present invention does not incorporate the use of a real-time clock. Rather the processing of all digital signal data is processed in real-time sequentially, utilizing FIFO 118, 120 & 122 (first-in, first-out) memory buffers. While microprocessor 127 does not arbitrate this process, it does track digital signal data via the Address Controls 119, 121 & 123. In this manner data is always processed in real-time in the exact timing in which it is presented to the present invention.

By tracking the distributed tasks as they are concurrently being executed prior to recording, such as the tasks described in FIG. 10.0, microprocessor 127 identifies a machine state of "time to record" within the present invention. Since the RECORD process will write data until the end-of-file, microprocessor 127 constantly monitors the conditions to write data until end-of-file is reached. Until such time when end-of-file is reached, microprocessor 127 identifies a machine state of "time to write data" to the RECORD task.

When the "time to write data" condition has been satisfied, microprocessor 127 issues task-based subroutines and their associated threads to configure the hardware to write data to the HDD. This involves the processes described herein to identify available DFAU's for storage and assign a DMA channel, common to the present technology, to receive digital signal data.

By coordinating Address Control 119 and 123, Storage Controller 125; Circular Memory 126 and Arbitration Block 124, microprocessor 127 is able to track the streaming of digital signal data in and out of FIFO 118 and 122, as described previously herein, and is able to control and manage the streaming of digital signal data to Digital Storage Media 105 and "write data to HDD". When the STOP command is issued, the file system directory is dynamically updated and the present invention is ready for a new command.

INDUSTRIAL APPLICABILITY

The present invention finds industrial applicability in the digital audio and video industry. In particular, the present invention relates to industrial applicability in the digital signal storage industry. More particularly, the present invention finds industrial applicability for storing and retrieving real time signals in the native format.

SCOPE OF THE INVENTION

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean one and only unless explicitly so stated, but rather one or more. All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form, material, and fabrication detail may be made without departing from the spirit and scope of the inventions as set forth in the appended claims. No claim herein is to be construed under the provisions of 35 U.S.C. 112, sixth paragraph, unless the element is expressly recited using the phrase "a means for".

The invention claimed is:

1. An embedded system comprising:
    a conforming interface which allocates, in real time, segments of a received signal based upon the timing at which the received signal is received into the conforming interface and which restores the received signal from the allocated segments, the conforming interface providing the segments of the received signal in a format that is independent of the timing of the received signal and preserves the received signal exactly as it is received;
    a storage device, including a storage medium, being provided for storing into and retrieving from the storage medium the allocated segments of the received signal;
    a format translator that converts the allocated segments between the format of the conformal interface and a format of the storage device; and
    a processor including a multi-tasking kernel which provides control programs running as parallel threads of controlling the operations of the conforming interface, the format translator and the storage device.

2. An embedded system as in claim 1, wherein the conforming interface is customizable to operate on any of a plurality of real time signals.

3. An embedded system as in claim 1, wherein the conforming interface provides a time stamp to the allocated segments of the received signal, when the received signal has irregular timing.

4. An embedded system as in claim 1, wherein the conforming interface receives multiple received signals simultaneously and provides multiple streams of allocated segments, each stream corresponding to a different one of the received signals.

5. An embedded system as in claim 1, wherein the storage device is configured to retrieve from the storage medium multiple streams of allocated segments of received signals simultaneously, each stream corresponding to a different one of the received signals.

6. An embedded system as in claim 1, wherein the conforming interface verifies integrity of the received signal in real time.

7. An embedded system as in claim 1, the storage device being capable of searching the storage medium bidirectionally.

* * * * *